(12) United States Patent
Page-Romer et al.

(10) Patent No.: US 11,900,486 B2
(45) Date of Patent: *Feb. 13, 2024

(54) METHOD AND APPARATUS FOR IMPROVING GENERATION OF COMPUTERIZED GROUPINGS

(71) Applicants: Kenneth Page-Romer, Long Beach, NY (US); Gregory George Page-Romer, Westfield, NJ (US)

(72) Inventors: Kenneth Page-Romer, Long Beach, NY (US); Gregory George Page-Romer, Westfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,764

(22) Filed: Feb. 28, 2023

(65) Prior Publication Data
US 2023/0316427 A1   Oct. 5, 2023

Related U.S. Application Data

(63) Continuation of application No. 16/535,239, filed on Aug. 8, 2019, now Pat. No. 11,593,892, which is a continuation-in-part of application No. 15/063,426, filed on Mar. 7, 2016, now abandoned.

(60) Provisional application No. 62/128,987, filed on Mar. 5, 2015.

(51) Int. Cl.
| | | |
|---|---|---|
| G06F 16/28 | (2019.01) | |
| G06Q 50/00 | (2012.01) | |
| G06Q 10/107 | (2023.01) | |
| G06F 16/35 | (2019.01) | |
| G06F 16/435 | (2019.01) | |
| G06Q 50/28 | (2012.01) | |
| G06Q 10/04 | (2023.01) | |
| G06F 12/02 | (2006.01) | |

(52) U.S. Cl.
CPC ........... *G06Q 50/01* (2013.01); *G06F 16/285* (2019.01); *G06F 16/355* (2019.01); *G06F 16/435* (2019.01); *G06Q 10/107* (2013.01); *G06F 12/0207* (2013.01); *G06Q 10/04* (2013.01); *G06Q 50/28* (2013.01)

(58) Field of Classification Search
CPC ...... G06Q 50/01; G06F 16/435; G06F 16/285
See application file for complete search history.

(56) References Cited

U.S. PATENT DOCUMENTS

| | | |
|---|---|---|
| 7,836,057 B1 | 11/2010 | Micaelian |
| 2005/0255914 A1 | 11/2005 | McHale |
| 2009/0326875 A1 | 12/2009 | Yanami |

(Continued)

*Primary Examiner* — Allen S Lin
(74) *Attorney, Agent, or Firm* — Charles A. Rattner

(57) ABSTRACT

Improved technological solutions are introduced for providing a secure and effective and enhanced clustering/grouping solution that is useful, for example, in an online dating forum as well as any number of other industries. The ability to attend live events in person or remotely is coupled with presence location and automatic verification of user devices and identities. This allows secured communication between participants without having to disclose actual contact information of the participants or their device addresses. An improved algorithm that groups members/items effectively based on a variety of matching criteria, with lowered possibilities of errors and more efficient use of processing power, is now introduced.

20 Claims, 26 Drawing Sheets

(56) References Cited

U.S. PATENT DOCUMENTS

2015/0178820 A1\* 6/2015 Green ................ G06Q 30/0613
    705/27.1
2017/0142119 A1\* 5/2017 Zhang .................. H04L 67/306
2017/0169495 A1 6/2017 Rathus
2019/0130359 A1\* 5/2019 Sterczyk .............. G06Q 10/105

\* cited by examiner

40

50

60
```
DEEPER DATING.COM
```
PROFILE MATCH SEARCH ENTRY FIELDS
61
MATCHING PROFILE INFORMATION TEXT
62
MATCHING PROFILE INFORMATION TEXT
63
MATCHING PROFILE INFORMATION TEXT
64
MATCHING PROFILE INFORMATION TEXT
65
FIG. 6

70

DEEPER DATING.COM

PROFILE COMPLETION INSTRUCTION TEXT

71

PROFILE LOGIN ENTRY FIELDS

72

PROFILE INFORMATION ENTRY FIELDS

73

74

80

90

1200

| //Attribute Name | Column Name | Type | Primary Key | Show Stopper | Default Weight | Comparison Column | Categories |
|---|---|---|---|---|---|---|---|
| Member_Attribute | firstname | Simple | TRUE | | 1 | | |
| Member_Attribute | gender_interested_in | Contains_Category_Singular | | TRUE | 1000 | gender | |
| Member_Attribute | age_interested_in | Age | | | 100 | age | |
| //Member_Attribute | age_interested_in | Spread_Category | | | 100 | age | "18-25","26-30","31-35","36-40","41-... |
| Member_Attribute | location_interested_in | Zip | | | 250 | location | |
| //Member_Attribute | State | Simple | | | 250 | | |
| Member_Attribute | Hiking | Spread_Category | | | 1 | | "Love this!","Occasionally","Unlikely" |
| Member_Attribute | Aerobics | Spread_Category | | | 1 | | "Love this!","Occasionally","Unlikely" |
| Member_Attribute | Running | Spread_Category | | | 1 | | "Love this!","Occasionally","Unlikely" |
| Member_Attribute | Weights | Spread_Category | | | 1 | | "Love this!","Occasionally","Unlikely" |
| Member_Attribute | Dancing | Spread_Category | | | 1 | | "Love this!","Occasionally","Unlikely" |
| //Member_Attribute | Hunting and Fishing | Spread_Category | | | 1 | | "Love this!","Occasionally","Unlikely" |
| Member_Attribute | Team Sports | Spread_Category | | | 1 | | "Love this!","Occasionally","Unlikely" |
| Member_Attribute | Swimming | Spread_Category | | | 1 | | "Love this!","Occasionally","Unlikely" |
| Member_Attribute | Climbing | Spread_Category | | | 1 | | "Love this!","Occasionally","Unlikely" |
| Member_Attribute | Extreme Sports | Spread_Category | | | 1 | | "Love this!","Occasionally","Unlikely" |
| Member_Attribute | Travel | Spread_Category | | | 1 | | "Love this!","Occasionally","Unlikely" |
| Member_Attribute | Movies | Spread_Category | | | 1 | | "Love this!","Occasionally","Unlikely" |
| Member_Attribute | Food | Spread_Category | | | 1 | | "Love this!","Occasionally","Unlikely" |
| Member_Attribute | Theater | Spread_Category | | | 1 | | "Love this!","Occasionally","Unlikely" |
| Member_Attribute | Concerts | Spread_Category | | | 1 | | "Love this!","Occasionally","Unlikely" |
| Member_Attribute | Reading | Spread_Category | | | 1 | | "Love this!","Occasionally","Unlikely" |
| //Member_Attribute | Art and museums | Spread_Category | | | 1 | | "Love this!","Occasionally","Unlikely" |

| Name | Gender | gender | interes:Location | Birth Date | age | intere: | location | intere:Travel | Movies | Theater | Reading |
|---|---|---|---|---|---|---|---|---|---|---|---|
| Alice | Female | Male | 90001 | 4/24/99 | 1/1/90 | 10001 | Occasionally | Unlikely | Unlikely | Occasionally |
| Bob | Male | Female | 90002 | 4/24/00 | 5 | 50 | Unlikely | Occasionally | Love this! | Love this! |
| Carol | Female | Male | 90003 | 4/24/50 | 5,10 | 50,75 | Love this! | Occasionally | Unlikely | Occasionally |
| Harry | Male | Female | 10001 | 5/23/62 | | | Unlikely | Unlikely | Occasionally | Unlikely |
| John | Male | Female | 10002 | 9/10/56 | | | Love this! | Occasionally | Occasionally | Unlikely |
| Ted | Male | Female | 90003 | 1/1/60 | | | Unlikely | Love this! | Love this! | Occasionally |
| Violet | Female | Male | 10003 | 8/16/91 | | | Occasionally | Occasionally | Occasionally | Unlikely |
| Wilma | Female | Male | 10004 | 4/23/96 | | | Unlikely | Love this! | Unlikely | Occasionally |

| Round | Group | Member1 | Member2 | Rank | Rank % | Group Score % |
|---|---|---|---|---|---|---|
| 1 | 1 | Ken-M63NY | Joannie-F67NY | 1 | 100 | 100 |
| 1 | 2 | Alice-F20LA | Bob-M19LA | 4 | 98 | 100 |
| 1 | 3 | Ali-F20LA | Bobby-M19LA | 7 | 95 | 100 |
| 1 | 4 | Deirdre-F23NY | Jessie-M18NY | 8 | 94 | 100 |
| 1 | 5 | Greg-M57NY | Merrie-F28NY | 9 | 93 | 100 |
| 1 | 6 | Carol-F70LA | Ted-M60LA | 12 | 91 | 100 |
| 1 | 7 | Caroline-F70LA | Teddy-M60LA | 15 | 88 | 100 |
| 1 | 8 | Hedy-F90NY | Hernan-M59NY | 26 | 79 | 100 |
| 2 | 1 | Joannie-F67NY | Hernan-M59NY | 2 | 99 | 100 |
| 2 | 2 | Alice-F20LA | Bobby-M19LA | 5 | 97 | 100 |
| 2 | 3 | Bob-M19LA | Ali-F20LA | 6 | 96 | 100 |
| 2 | 4 | Ken-M63NY | Merrie-F28NY | 11 | 92 | 100 |
| 2 | 5 | Carol-F70LA | Teddy-M60LA | 13 | 90 | 100 |
| 2 | 6 | Ted-M60LA | Caroline-F70LA | 14 | 89 | 100 |
| 2 | 7 | Greg-M57NY | Deirdre-F23NY | 16 | 88 | 100 |
| 2 | 8 | Jessie-M18NY | Hedy-F90NY | 23 | 82 | 100 |

| Round | Group | Member | Rank | Rank % | Score % |
|---|---|---|---|---|---|
| 1 | 1 | Carol | 1 | 100 | 100 |
| 1 | 1 | Ted | 1 | 100 | 100 |
| 1 | 2 | John | 2 | 96 | 100 |
| 1 | 2 | Violet | 2 | 96 | 100 |
| 1 | 3 | Harry | 3 | 93 | 100 |
| 1 | 3 | Wilma | 3 | 93 | 100 |
| 1 | 4 | Alice | 5 | 86 | 100 |
| 1 | 4 | Bob | 5 | 86 | 100 |
| 2 | 1 | Harry | 4 | 89 | 100 |
| 2 | 1 | Violet | 4 | 89 | 100 |
| 2 | 2 | John | 6 | 82 | 100 |
| 2 | 2 | Wilma | 6 | 82 | 100 |
| 2 | 3 | Bob | 8 | 75 | 100 |
| 2 | 3 | Carol | 8 | 75 | 100 |
| 2 | 4 | Alice | 10 | 68 | 100 |
| 2 | 4 | Ted | 10 | 68 | 100 |
| 3 | 1 | Alice | 7 | 79 | 100 |
| 3 | 1 | Harry | 7 | 79 | 100 |
| 3 | 2 | Ted | 11 | 64 | 100 |
| 3 | 2 | Violet | 11 | 64 | 100 |
| 3 | 3 | Bob | 12 | 61 | 100 |
| 3 | 3 | Wilma | 12 | 61 | 100 |
| 3 | 4 | Carol | 14 | 54 | 100 |
| 3 | 4 | John | 14 | 54 | 100 |

| Member | Round | Group |
|--------|-------|-------|
| Alice  | 1     | 4     |
| Alice  | 2     | 4     |
| Alice  | 3     | 1     |
| Bob    | 1     | 4     |
| Bob    | 2     | 3     |
| Bob    | 3     | 3     |
| Carol  | 1     | 1     |
| Carol  | 2     | 3     |
| Carol  | 3     | 4     |
| Harry  | 1     | 3     |
| Harry  | 2     | 1     |
| Harry  | 3     | 1     |
| John   | 1     | 2     |
| John   | 2     | 2     |
| John   | 3     | 4     |
| Ted    | 1     | 1     |
| Ted    | 2     | 4     |
| Ted    | 3     | 2     |
| Violet | 1     | 2     |
| Violet | 2     | 1     |
| Violet | 3     | 2     |
| Wilma  | 1     | 3     |
| Wilma  | 2     | 2     |
| Wilma  | 3     | 3     |

| -10000000 | 1169 | -9999975 | 1378 | 1337 | 995 | -9999681 | -9999592 |
|---:|---:|---:|---:|---:|---:|---:|---:|
| 1370 | -10000000 | 1221 | -10000353 | -10000329 | -9999825 | 672 | 847 |
| -9999825 | 1221 | -10000000 | 645 | 800 | 1321 | -10000327 | -10000351 |
| 1101 | -9999928 | 1063 | -10000000 | -9999591 | -9999934 | 1248 | 1283 |
| 1048 | -9999929 | 1085 | -9999589 | -10000000 | -9999888 | 1297 | 1254 |
| 1223 | -9999725 | 1372 | -9999884 | -9999888 | -10000000 | 1093 | 986 |
| -9999946 | 1101 | -9999952 | 1304 | 1292 | 1094 | -10000000 | -9999690 |
| -9999833 | 1163 | -10000001 | 1298 | 1284 | 997 | -9999689 | -10000000 |

| Member1 | Member2 | Member3 | Group Score |
|---|---|---|---:|
| Carol | Greg | Ken | 7616 |
| Alice | Greg | Ken | 7244 |
| Alice | Bob | Greg | -9993616 |
| Alice | Bob | Ken | -9993656 |
| Bob | Carol | Ken | -9993804 |
| Bob | Carol | Greg | -9993896 |
| Carol | Greg | Ted | -9995376 |
| Carol | Ken | Ted | -9995384 |
| Alice | Greg | Ted | -9995616 |
| Alice | Ken | Ted | -9995756 |

| 90746 | 33.857416 | -118.2563 |
|---:|---:|---:|
| 91123 | 33.786594 | -118.2987 |
| 91344 | 34.277648 | -118.5005 |
| 91345 | 34.264635 | -118.4596 |
| 91363 | 33.786594 | -118.2987 |
| 91380 | 33.786594 | -118.2987 |
| 91395 | 33.786594 | -118.2987 |

| ID | Name | gender | gender_interest | Location | Country | State | City | Age | Hiking | Aerobics |
|---|---|---|---|---|---|---|---|---|---|---|
| 1 | Alice-F20LA | Female | Male | 90001 | US | CA | Los Angeles | 4/24/99 | Unlikely | Occasionally |
| 2 | Bob-M19LA | Male | Female | 90002 | US | CA | Los Angeles | 4/24/00 | Occasiona | Occasionally |
| 3 | Carol-F70LA | Female | Male | 90003 | US | CA | Los Angeles | 4/24/50 | Unlikely | Occasionally |
| 4 | Greg-M57NY | Male | Female | 11561 | US | NY | Long Beach | 5/23/62 | Love this! | Occasionally |
| 5 | Ken-M63NY | Male | Female | 11561 | US | NY | Long Beach | 9/10/56 | Love this! | Occasionally |
| 6 | Ted-M60LA | Male | Female | 90003 | US | CA | Los Angeles | 1/1/60 | Unlikely | Occasionally |
| 7 | Merrie-F28NY | Female | Male | 10601 | US | NY | White Plains | 8/16/91 | Unlikely | Occasionally |
| 8 | Deirdre-F23NY | Female | Male | 7030 | US | NJ | Hoboken | 4/23/96 | Unlikely | Occasionally |
| 9 | Jessie-M18NY | Male | Female | 11561 | US | NY | Long Beach | 5/15/01 | Occasiona | Occasionally |
| 10 | Hedy-F90NY | Female | Male | 11561 | US | NY | Long Beach | 8/15/29 | Unlikely | Occasionally |
| 11 | Joannie-F67NY | Female | Male | 11520 | US | NY | Freeport | 2/1/52 | Love this! | Occasionally |
| 12 | Hernan-M59NY | Male | Female | 11375 | US | NY | Forest Hills | 9/10/58 | Love this! | Occasionally |

| Round | Group | Member1 | Member2 | Member3 | Member4 | Rank | Rank % |
|---|---|---|---|---|---|---|---|
| 1 | 1 | Ken-M63NY | Merrie-F28NY | Joannie-F67NY | Hernan-M59NY | 1 | 100 |
| 1 | 2 | Alice-F20LA | Bob-M19LA | Ali-F20LA | Bobby-M19LA | 2 | 100 |
| 1 | 3 | Carol-F70LA | Ted-M60LA | Caroline-F70LA | Teddy-M60LA | 6 | 100 |
| 1 | 4 | Greg-M57NY | Deirdre-F23NY | Jessie-M18NY | Hedy-F90NY | 67 | 96 |
| 2 | 1 | Greg-M57NY | Deirdre-F23NY | Jessie-M18NY | Joannie-F67NY | 30 | 98 |
| 2 | 2 | Bob-M19LA | Ted-M60LA | Merrie-F28NY | Hedy-F90NY | 567 | 69 |
| 2 | 3 | Carol-F70LA | Bobby-M19LA | Caroline-F70LA | Teddy-M60LA | 23 | 99 |
| 2 | 4 | Alice-F20LA | Ken-M63NY | Hernan-M59NY | Ali-F20LA | 466 | 74 |

| Round | Group | Member1 | Member2 | Rank | Rank % |
|---|---|---|---|---|---|
| 1 | 1 | Ken-M63NY | Joannie-F67NY | 1 | 100 |
| 1 | 2 | Alice-F20LA | Bob-M19LA | 4 | 98 |
| 1 | 3 | Ali-F20LA | Bobby-M19LA | 7 | 95 |
| 1 | 4 | Deirdre-F23NY | Jessie-M18NY | 8 | 94 |
| 1 | 5 | Greg-M57NY | Merrie-F28NY | 9 | 93 |
| 1 | 6 | Carol-F70LA | Ted-M60LA | 12 | 91 |
| 1 | 7 | Caroline-F70LA | Teddy-M60LA | 15 | 88 |
| 1 | 8 | Hedy-F90NY | Hernan-M59NY | 26 | 79 |
| 2 | 1 | Joannie-F67NY | Hernan-M59NY | 2 | 99 |
| 2 | 2 | Alice-F20LA | Bobby-M19LA | 5 | 97 |
| 2 | 3 | Bob-M19LA | Ali-F20LA | 6 | 96 |
| 2 | 4 | Ken-M63NY | Merrie-F28NY | 11 | 92 |
| 2 | 5 | Carol-F70LA | Teddy-M60LA | 13 | 90 |
| 2 | 6 | Ted-M60LA | Caroline-F70LA | 14 | 89 |
| 2 | 7 | Greg-M57NY | Deirdre-F23NY | 16 | 88 |
| 2 | 8 | Jessie-M18NY | Hedy-F90NY | 23 | 82 |

| ID | firstname lastname | user email | gender | gender_interested_in | Location | Country | state | City | Age |
|---|---|---|---|---|---|---|---|---|---|
| 1 | Alice-F20LA | alice@e.com | Female | Male | 90001 | US | CA | Los Angeles | 4/24/1999 |
| 2 | Bob-M19LA | bob@e.com | Male | Female | 90001 | US | CA | Los Angeles | 4/24/2000 |
| 3 | Carol-F70LA | carol@e.com | Female | Male | 90001 | US | CA | Los Angeles | 4/24/1950 |
| 4 | Greg-M57NY | greg@e.com | Male | Female | 10001 | US | NY | New York | 5/23/1962 |
| 5 | Ken-M63NY | ken@e.com | Male | Female | 10001 | US | NY | New York | 9/10/1956 |
| 6 | Ted-M60LA | ted@e.com | Male | Female | 90001 | US | CA | Los Angeles | 1/1/1960 |
| 7 | Merrie-F28NY | merrie@e.com | Female | Male | 10001 | US | NY | New York | 8/16/1991 |
| 8 | Deirdre-F23NY | deirdre@e.com | Female | Male | 10001 | US | NY | New York | 4/23/1996 |
| 9 | Jessie-M18NY | jessie@e.com | Male | Female | 10001 | US | NY | New York | 5/15/2001 |
| 10 | Hedy-F90NY | hedy@e.com | Female | Male | 10001 | US | NY | New York | 8/15/1929 |
| 11 | Joannie-F67NY | joannie@e.com | Female | Male | 10001 | US | NY | New York | 2/1/1952 |
| 12 | Hernan-M59NY | hernan@e.com | Male | Female | 10001 | US | NY | New York | 9/10/1958 |

| Round | Group | Member1 | Member2 | Member3 | Member4 | Rank | Rank % |
|---|---|---|---|---|---|---|---|
| 1 | 1 | Ken-M63NY | Merrie-F28NY | Joannie-F67NY | Hernan-M59NY | 1 | 100 |
| 1 | 2 | Alice-F20LA | Bob-M19LA | Carol-F70LA | Ted-M60LA | 28 | 95 |
| 1 | 3 | Greg-M57NY | Deirdre-F23NY | Jessie-M18NY | Hedy-F90NY | 33 | 94 |
| 2 | 1 | Greg-M57NY | Merrie-F28NY | Deirdre-F23NY | Jessie-M18NY | 17 | 97 |
| 2 | 2 | Ken-M63NY | Hedy-F90NY | Joannie-F67NY | Hernan-M59NY | 7 | 99 |
| 2 | 3 | Alice-F20LA | Bob-M19LA | Carol-F70LA | Ted-M60LA | 28 | 95 |

| Round | Group | Member1 | Member2 | Member3 | Rank | Rank % |
|---|---|---|---|---|---|---|
| 1 | 1 | Ken-M63NY | Joannie-F67NY | Hernan-M59NY | 1 | 100 |
| 1 | 2 | Merrie-F28NY | Deirdre-F23NY | Jessie-M18NY | 16 | 93 |
| 1 | 3 | Alice-F20LA | Bob-M19LA | Carol-F70LA | 21 | 91 |
| 1 | 4 | Greg-M57NY | Ted-M60LA | Hedy-F90NY | 96 | 57 |
| 2 | 1 | Greg-M57NY | Merrie-F28NY | Hernan-M59NY | 4 | 99 |
| 2 | 2 | Ken-M63NY | Deirdre-F23NY | Hedy-F90NY | 46 | 80 |
| 2 | 3 | Carol-F70LA | Ted-M60LA | Joannie-F67NY | 82 | 63 |
| 2 | 4 | Alice-F20LA | Bob-M19LA | Jessie-M18NY | 55 | 75 |

| Round | Group | Member1 | Member2 | Rank | Rank % |
|---|---|---|---|---|---|
| 1 | 1 | Ken-M63NY | Joannie-F67NY | 1 | 100 |
| 1 | 2 | Alice-F20LA | Bob-M19LA | 4 | 95 |
| 1 | 3 | Deirdre-F23NY | Jessie-M18NY | 5 | 94 |
| 1 | 4 | Greg-M57NY | Merrie-F28NY | 6 | 92 |
| 1 | 5 | Carol-F70LA | Ted-M60LA | 7 | 91 |
| 1 | 6 | Hedy-F90NY | Hernan-M59NY | 17 | 76 |
| 2 | 1 | Joannie-F67NY | Hernan-M59NY | 2 | 98 |
| 2 | 2 | Ken-M63NY | Merrie-F28NY | 9 | 88 |
| 2 | 3 | Greg-M57NY | Deirdre-F23NY | 11 | 85 |
| 2 | 4 | Bob-M19LA | Carol-F70LA | 13 | 82 |
| 2 | 5 | Jessie-M18NY | Hedy-F90NY | 15 | 79 |
| 2 | 6 | Alice-F20LA | Ted-M60LA | 19 | 73 |

| Round | Group | Member | Rank | Rank % |
|---|---|---|---|---|
| 1 | 1 | Joannie-F67NY | 1 | 100 |
| 1 | 1 | Ken-M63NY | 1 | 100 |
| 1 | 2 | Merrie-F28NY | 4 | 98 |
| 1 | 2 | Ted-M60LA | 4 | 98 |
| 1 | 3 | Alice-F20LA | 6 | 96 |
| 1 | 3 | Bob-M19LA | 6 | 96 |
| 1 | 4 | Ali-F20LA | 9 | 93 |
| 1 | 4 | Bobby-M19LA | 9 | 93 |
| 1 | 5 | Deirdre-F23NY | 10 | 92 |
| 1 | 5 | Jessie-M18NY | 10 | 92 |
| 1 | 6 | Carol-F70LA | 21 | 83 |
| 1 | 6 | Teddy-M60LA | 21 | 83 |
| 1 | 7 | Hedy-F90NY | 48 | 61 |
| 1 | 7 | Hernan-M59NY | 48 | 61 |
| 1 | 8 | Caroline-F70LA | 58 | 52 |
| 1 | 8 | Greg-M57NY | 58 | 52 |
| 2 | 1 | Hernan-M59NY | 2 | 99 |
| 2 | 1 | Joannie-F67NY | 2 | 99 |
| 2 | 2 | Merrie-F28NY | 5 | 97 |
| 2 | 2 | Teddy-M60LA | 5 | 97 |
| 2 | 3 | Alice-F20LA | 7 | 95 |
| 2 | 3 | Bobby-M19LA | 7 | 95 |
| 2 | 4 | Ali-F20LA | 8 | 94 |
| 2 | 4 | Bob-M19LA | 8 | 94 |
| 2 | 5 | Carol-F70LA | 20 | 84 |
| 2 | 5 | Ted-M60LA | 20 | 84 |
| 2 | 6 | Deirdre-F23NY | 24 | 81 |
| 2 | 6 | Greg-M57NY | 24 | 81 |
| 2 | 7 | Hedy-F90NY | 32 | 74 |
| 2 | 7 | Jessie-M18NY | 32 | 74 |
| 2 | 8 | Caroline-F70LA | 52 | 58 |
| 2 | 8 | Ken-M63NY | 52 | 58 |

| Member | Round | Group |
|---|---|---|
| Ali-F20LA | 1 | 4 |
| Ali-F20LA | 2 | 4 |
| Alice-F20LA | 1 | 3 |
| Alice-F20LA | 2 | 3 |
| Bob-M19LA | 1 | 3 |
| Bob-M19LA | 2 | 4 |
| Bobby-M19LA | 1 | 4 |
| Bobby-M19LA | 2 | 3 |
| Carol-F70LA | 1 | 6 |
| Carol-F70LA | 2 | 5 |
| Caroline-F70LA | 1 | 8 |
| Caroline-F70LA | 2 | 8 |
| Deirdre-F23NY | 1 | 5 |
| Deirdre-F23NY | 2 | 6 |
| Greg-M57NY | 1 | 8 |
| Greg-M57NY | 2 | 6 |
| Hedy-F90NY | 1 | 7 |
| Hedy-F90NY | 2 | 7 |
| Hernan-M59NY | 1 | 7 |
| Hernan-M59NY | 2 | 1 |
| Jessie-M18NY | 1 | 5 |
| Jessie-M18NY | 2 | 7 |
| Joannie-F67NY | 1 | 1 |
| Joannie-F67NY | 2 | 1 |
| Ken-M63NY | 1 | 1 |
| Ken-M63NY | 2 | 8 |
| Merrie-F28NY | 1 | 2 |
| Merrie-F28NY | 2 | 2 |
| Ted-M60LA | 1 | 2 |
| Ted-M60LA | 2 | 5 |
| Teddy-M60LA | 1 | 6 |
| Teddy-M60LA | 2 | 2 |

METHOD AND APPARATUS FOR IMPROVING GENERATION OF COMPUTERIZED GROUPINGS

CROSS-REFERENCE TO RELATED APPLICATIONS

This application claims priority under 35 U.S.C. § 120 as a continuation of U.S. Pat. No. 11,593,892, which claims priority under 35 U.S.C. § 120 as a continuation-in-part of pending U.S. patent application Ser. No. 15/063,426 entitled "METHOD AND APPARATUS FOR ENHANCED ONLINE DATING" filed in the name of Page et al. on Mar. 7, 2016, which in turn claims priority under 35 U.S.C. § 119 to U.S. Provisional Patent Appl. Ser. No. 62/128,987 entitled "ENHANCED ONLINE DATING" filed in the name of Page et al. on Mar. 5, 2015, the entirety of which is incorporated herein by reference.

REFERENCE TO SEQUENCE LISTING, A TABLE, OR A COMPUTER LISTING APPENDIX

This non-provisional application incorporates-by-reference a computer program listing appendix having the following file name, file size in bytes, and date of creation as submitted herewith: "ALGO CODE.TXT," 494,248 bytes, Jul. 31, 2019.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure generally relates to electronic communications, and in particular, it relates to electronic communications involving condition responsive indicating and grouping systems.

BACKGROUND

Even with the absolute explosion of online dating sites and applications in the twenty-first century, the number of single people keeps growing worldwide. For example, in the US, the majority of adults today are unmarried. It's not that people aren't meeting, because online dating has been facilitating countless new meetings and connections. But all these "meetings" aren't turning into lasting love. Part of the reason is in the ways people meet; ways which sculpt shallow, objectifying interactions that are less likely to blossom into relationships. In-person dating events are often cold and dehumanizing, as are online dating sites and apps. Dating algorithms have been shown to be unreliable in making matches. Many recent "dating apps" have socially devolved to encourage superficial interactions and "hook-ups." Such one-dimensional profile browsing eliminates much of the human element that tends to spark romance. Research shows that one of the key factors in sparking attraction is increasingly vulnerable levels of communication. Online dating may facilitate many connections, but increasingly intimate and vulnerable conversations rarely happen during online dating. Accordingly, there is a need for methods and systems for enhanced online dating, various embodiments of which will now be described in detail herein.

SUMMARY

Enhanced online dating, sometimes referred to herein as DEEPER DATING, allows for a workshop/lecture/class-like setting for people to meet and interact in many different groupings, seeing each others picture or webcam as they do so, and then bringing them into an online community where they can look at each others profiles and interact with each other through direct messaging, and forums. There will also be associated in-person events, media events, and social media link-ins. DEEPER DATING online events replicate DEEPER DATING in-person events, joining the warmth and excitement of an actual DEEPER DATING event with the ease, comfort and marketing potential of the virtual world.

There are few significant challenges associated with these in-person events, however, that are overcome by the technological improvements of the present disclosure. First, the section in which participants mingle and exchange numbers, although very valuable and not at all impersonal, is extremely challenging. People found this part useful but very stressful. DEEPER DATING online, among its many benefits, creates a layer of safety since it is much easier to approach someone new through a direct message than to do so in person.

Second, in-person events are often harder to attend. Issues of health, weather, ease-of-access and transportation can get in the way of being able to show up in person. DEEPER DATING online allows participants to attend events from the privacy and comfort of their home. All they need is an internet connection.

It is often desirable to break up live events into smaller groups of individual participants, perhaps with like interests-group such individual participants, until each has, for example, had a chance to meet the other at least once. As with the famous mathematical "travelling salesman" problem, the computation of rotating, non-repeating groups becomes computationally intensive and can quickly swamp even the most robust of modern computers and processors. Accordingly, a streamlined grouping algorithm has been developed and is introduced herein in order to improve the performance of computers in performing these functions, which are applicable in the realm of online or in-person dating events, but also for a wide variety of other industries such as transportation, shipping, inventory management, marketing research, personnel tracking, item tracking, conference management, educational or research groupings, social gathering organizing and the like.

BRIEF DESCRIPTION OF THE VARIOUS DRAWINGS

Further aspects of the present disclosure will be more readily appreciated upon review of the detailed description of its various embodiments, provided above, when taken in conjunction with the following Figures, of which:

FIG. 6 is an exemplary enhanced online dating community profile search page presented over the network environment of FIG. 1;

FIG. 12-28 are exemplary input sheets or resulting outputs generated by the specific improved grouping process of FIG. 11;

DETAILED DESCRIPTION

Enhanced Online Dating is a completely new concept in online meetings joining the warmth and excitement of an actual in-person event like DEEPER DATING with the ease, comfort and marketing potential of the virtual world. It is part personal growth workshop, part cutting edge online meeting, part dating website, and part gathering place for single people with shared interests in an infinite number of arenas.

DEEPER DATING online is an unprecedented new way for single people to meet. The live events are like speed dating but with brains and heart—done from the privacy of a participant's home. In these events, participants will learn some of the most exciting, research-backed insights about finding love, and then meet many new single people through stimulating and enjoyable conversations—all online!

Research shows that dating profile matching algorithms found in dating website of the prior art largely don't really work as a matching tool for finding love. But multiple studies by top researchers in the field of attraction show what does work. These findings are so simple and so time-honored that it is incredible that no one has put them into practice in the creation of endless new dating apps, until now.

Everyone knows that the online dating world may boast countless new possibilities for matches, but that it is anything but warm, positive and engaging. People match better as they get to know each other. The more warm, positive, and engaging interaction, the more chance for a match to occur.

Technology now allows us to offer the infinite numbers of online daters with ways of meeting that are positive, engaging and fun. DEEPER DATING online creates enjoyable, exciting, and positive ways for single people to meet.

We have done trial DEEPER DATING Online events to test the model, and the overall concept works extremely well.

Figure 1:
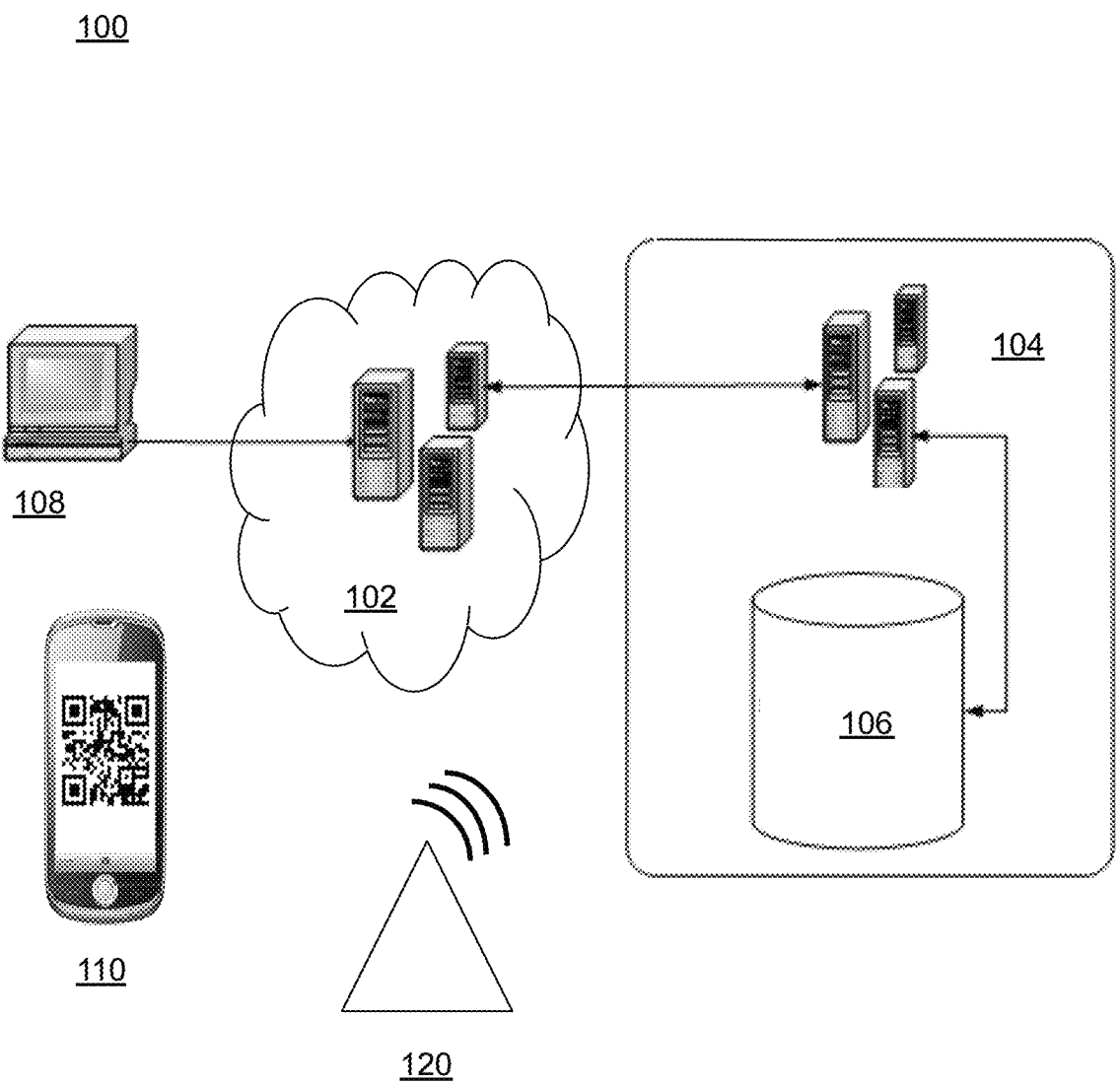
FIG. 1 is an illustration of an exemplary network environment in which the methods and apparatus of the present disclosure may be exclusively operative.

Turning to FIG. 1, therein is depicted an illustration of an exemplary data communication network environment 100 over which user devices may interact with each other and the enhanced online dating website. The enhanced online dating server(s) 104 are the hub of the network environment 100, the special programming of which as described herein enables user computer devices 108 and/or user mobile devices 110 to interact as described herein over a data communication network, such as the Internet. The enhanced online dating server(s) 104 may be one or a group of distributed or centralized network computer servers. Such servers, like any common personal computer, include well-known processors, electronic memory, network communication hardware, user interfaces, input/output devices, operating system software, and application software suitable for accomplishing the functions described herein. A suitable computer server may be one or more enterprise network servers of the type commonly manufactured by CISCO, DELL and IBM. The enhanced online dating server(s) 104 may be configured to perform the functionalities described herein through suitable programming in C++, PHP, JAVASCRIPT or the like, and may include at least one database 106 for storing the data described herein and database management software, for example, similar to the Structured Query Language (SQL)-type databases distributed by ORACLE. The enhanced online dating server(s) 104 may be centrally located or may be distributed among a variety of geographical locations, and may cooperate to enable to social networking functions described herein. The enhanced online dating server(s) 104 may act as a "cloud" service to a plurality of users.

Users will typically maintain an account with the operator of the enhanced online dating server(s) 104. Such account will be registered with the DEEPER DATING system. In addition to user account information, personal profile information and monetary amounts due for subscribing to this service may likewise be stored in database 106.

User terminals 108 may be one or more separate consumer computing devices that are operative to communicate data bi-directionally with the enhanced online dating server(s) 104 over a computer network, such as the Internet. The user terminals 108 may be owned and operated by separate and distinct users. Users may be assigned a login to access the enhanced online dating server(s) 104. When interacting with the enhanced online dating server(s) 104 over the Internet, a display of the user terminal 108 may be changed and updated to enable the customer to directly interact with the enhanced online dating server(s) 104 in the manners described herein.

User terminals 108 may be any suitable computing or communication device used to accomplish the processes described herein. They may be, for example, a personal computer, laptop computer, notebook computer, mobile telephone, smartphone, tablet, personal digital assistant or like device of the type commonly manufactured by IBM CORP, DELL CORP. and APPLE CORP., and having suitable operating system software (i.e., WINDOWS XP, WINDOWS 8, WINDOWS 10, MAC OS X, SUN OS), application software, visual displays, processors, electronic memory, network communication hardware, user interfaces (such as a visible display), and other suitable input/output devices, as are well-known and suitable for accomplishing the functions described herein.

The network environment 100 includes one or more communications interface servers 102, that coordinate communications between user computing devices 108, user mobile devices 110 location determination devices 120 and the enhanced online dating server(s) 104. In certain embodiments, the network environment 100 is implemented over a publicly-accessible computer network, such as the Internet or World Wide Web, via network interface servers 102, which may be any type of server mentioned above. The disclosure is not limited to implementation in any specific network configuration. The location determination devices 120 are readily contemplated to include the use of any wireless and/or hard-wired devices operating in conjunction with satellite, microwave, fiber optic, copper, local area networks (LANs), wide-are networks (WANs), WIFI, IEEE 802.11-based protocols, WIMAX and/or other network configurations. The location determination devices may likewise include Bluetooth or WI-FI beacons, GPS geo-fencing systems, near-field proximity detectors, radio-frequency identification (RFID) tags or the like. In certain embodiments, the location determination devices 120 may be a display of a barcode or other machine-readable indicia that may be scanned by a user mobile device 110, the scanning of which will confirm a user's presence at a location.

The network environment 100 may be implemented in any type of system comprising interconnected computers configured to communicate data with each other using messages transmitted electronically or via other means, without limitation. Data may be transmitted between the computers, devices and servers shown in FIG. 1 using any of the variety of data formats including, but not limited to, Hypertext Transfer Protocol (HTTP), file transfer protocol (FTP), or any other suitable data transmission protocols. Data transmissions may also be encrypted with any of a variety of known technologies, including secure socket layer (SSL) topologies.

Figure 2:
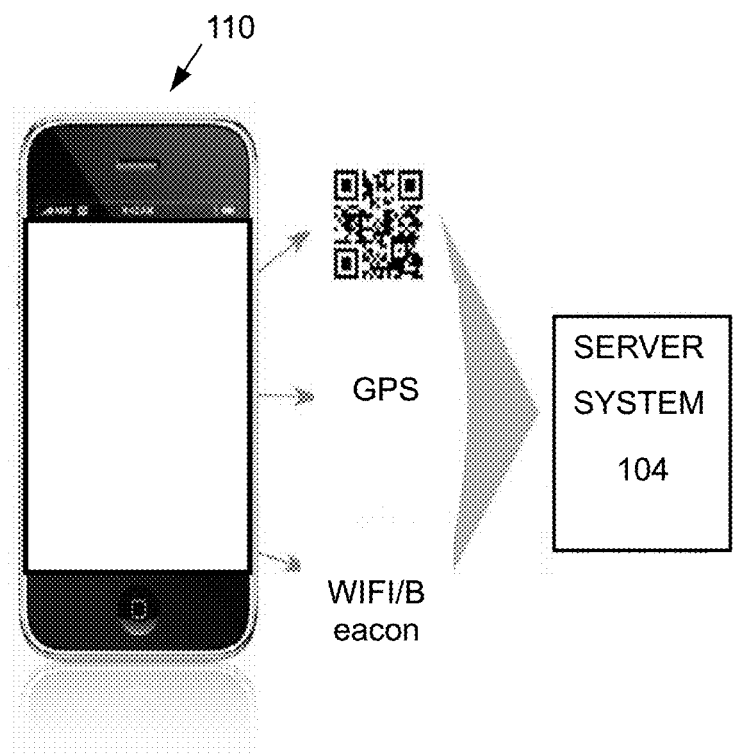
FIG. 2 is a representation of an exemplary user mobile presence verification system that may be used in the network environment of FIG. 1.

As depicted in FIG. 2, a user may use a wireless communication device such as user mobile device 110, which may be a cellular telephone having an imaging device, such as a still or video camera. The user mobile device 110 may also include an interface, such as a browser application, for accessing the Internet or other computer network. Examples of such web browsers include SAFARI, INTERNET EXPLORER and FIREFOX. The user mobile device 110 may also include appropriate native hardware and software to send and receive SMS or text messages, and electronic mail messages. Messages transmission may be facilitated by the DEEPER DATING website in such manner that participants can communicate with each other without having to disclose telephone number of the user's mobile device 110 or the actual e-mail address of a user. A proprietary application may optionally be provided on the user mobile device 110 to perform the scanning and/or web interface functions described herein. The wireless device 20 may additionally include appropriate hardware and software for interacting with a global positioning system (GPS), such that the user mobile device 110 may determine its geographic location. Additionally, the user mobile device 110 may include any of a variety of software applications for imaging and decoding a code or symbol, such as a QR code. Examples of such code-reading applications include NEOREADER, MOBILETAG and CODE READER. Examples of cellular telephones on the market today that are equipped with the features above include the IPHONE, BLACKBERRY, and ANDROID smartphones.

The user mobile device 110 is operable to communicate bi-directionally with a computer server system 104 over any of a variety of communications networks, via a wireless communication 200 which may include Wi-Fi, GPS, SMS, cellular or other types of data transmissions. Such communications networks may include a cellular telephone network, a cellular data network and a wireless computer network of the type operated by VERIZON and AT&T. The communication network may provide access to any variety of hard-wired or wireless computer networks now known or heretofore developed, including, without limitation, local area networks, wide area networks, fiber optic networks, satellite communication networks, as well as the World Wide Web.

Figure 3:
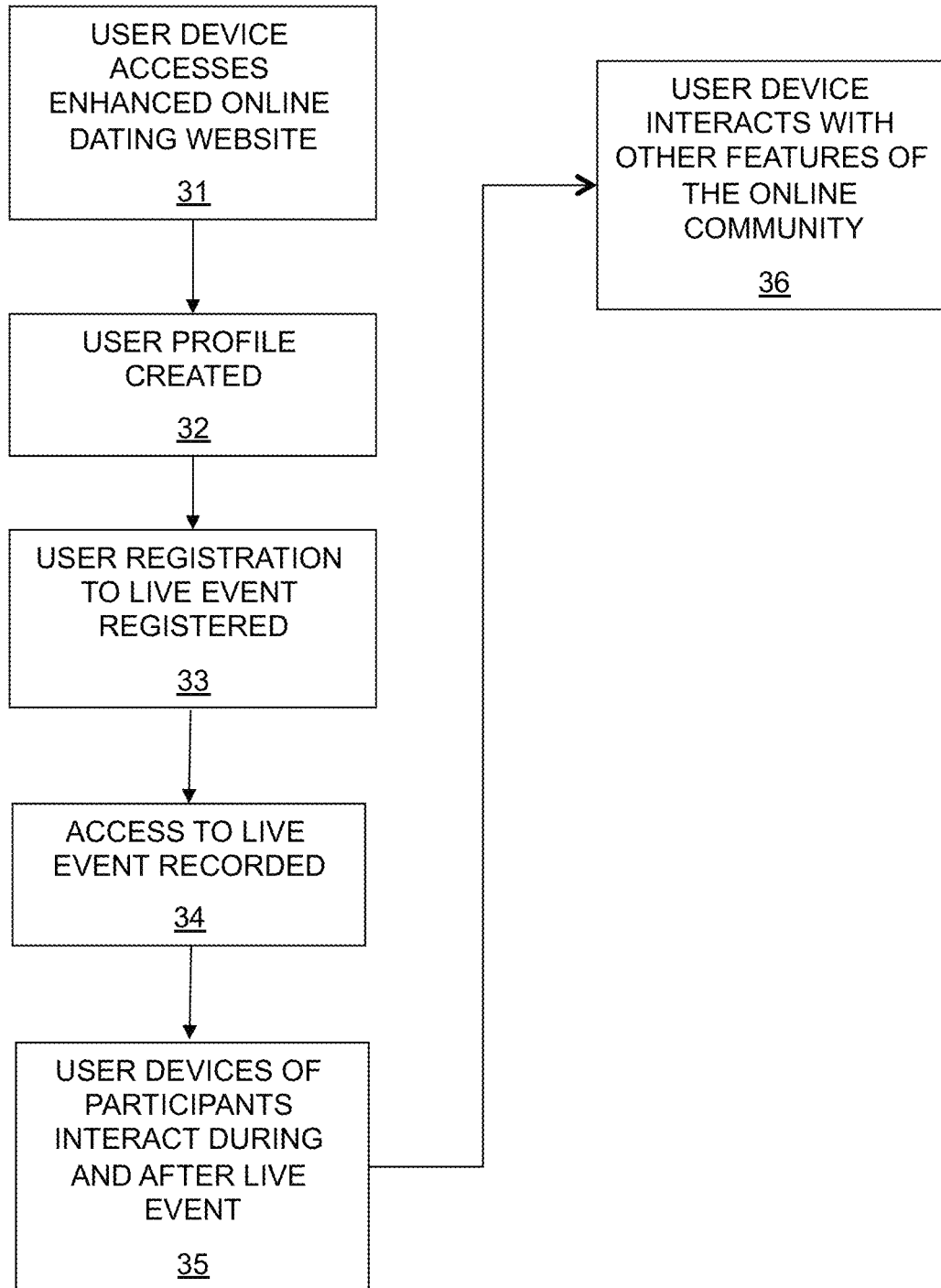
FIG. 3 is a flowchart of an exemplary participant interaction process with the network environment of FIG. 1.
Figure 4:
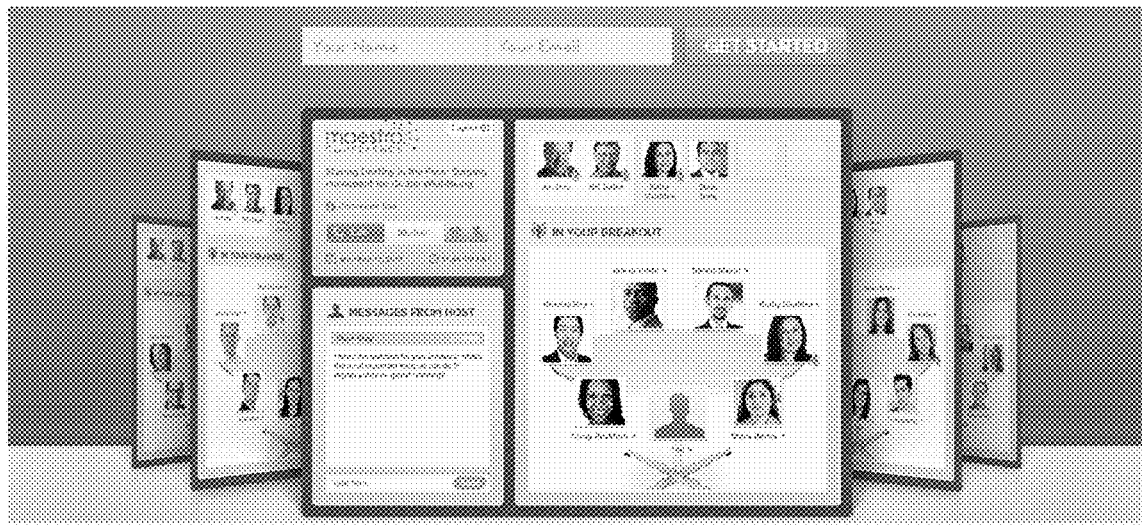
FIG. 4 is an exemplary enhanced online dating community welcome page presented over the network environment of FIG. 1.

Turning now to FIG. 3, therein is presented a participant interaction process 30 with the network environment 100. The process 30 commences at step 31, where users visit to the DEEPER DATING website, where they can learn about upcoming live dating events and register for such events to attend remotely or in-person. The website, an example of the display of which is shown in FIG. 4, includes a description of what differentiates us from other programs and services for single people; what makes us unique, exciting, inspiring, and why this approach represents a new model of looking for love. It may point out shortcomings of other dating events and describe why this method works better, mentioning how this is based not upon profile matching algorithms, flat profiles, or limited, demeaning ways of meeting, but based instead upon the very values that lead people to bond: shared values, shared interests, and engaging on a human scale with real interaction.

The DEEPER DATING website may further include a welcome video explaining this new approach, and congratulating them on becoming part of a whole new way to meet. This video would have extras such as graphics, animation, video clips from top experts, and the like describing how DEEPER DATING integrates both cutting edge research, and the power of technology to create real-life positive ways of engaging—right from your own home.

The DEEPER DATING website may further include endorsements from famous people or thought leaders.

The content of the DEEPER DATING website may be filtered by a visiting user's location: (city, state) and personal interests. For example, there could be many buttons with different interests, such as Theatre, Education/learning, Personal Growth and Human Potential, Travel, Art, Service to Others, Living Green, Exercise, etc. Users can select their top choices via selection of such buttons, and their preferences will be stored in database 106 and automatically added to their profile.

Figure 7:
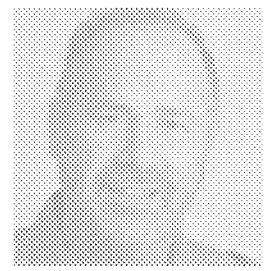
FIG. 7 is an exemplary enhanced online dating community profile information entry page presented over the network environment of FIG. 1.

Turning now to step 32, users next register and create a profile. FIG. 7 shows an example of a registration page 70.

Turning now to step 33, users may sign up for and pay admission to an upcoming live event. For events generated by DEEPER DATING, registration and payment would happen on the DEEPER DATING website.

Participants must also register with the platform in which the event will be simulcast on the Internet, such as on the existing service MAESTROCONFERENCE. Users will first be sent a link with which to register for the actual online meeting event, an example of which is as follows:

maestroconference.com/conference/register/
9P8QJOAPWGMIZLF4

It is also possible to use other platforms of similar functionality, such as ZOOM (ZOOM.us), SKYPE, GOOGLE HANGOUTS, and the like. For ease of discussion, embodiments herein will be described in conjunction with involving ZOOM-enabled or MAESTROCONFERENCE-enabled functionality. Alternatively, a similar, separate communications platform involving such functionalities could be assembled and employed by one of ordinary skill in the art.

Figure 5:
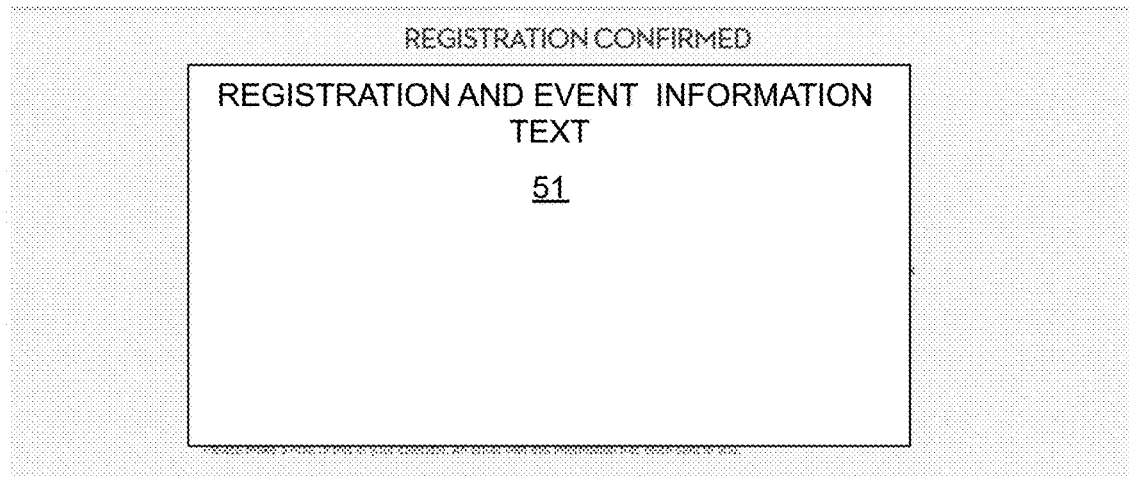
FIG. 5 is an exemplary enhanced online dating community registration page presented over the network environment of FIG. 1.

When users register for an upcoming event, they get the details they need to register: their own URL, phone number and password. At some point before the actual event, participants also need to upload their picture; the same picture they used in their profile. When a user is registered, they may receive a display of a registration confirmation screen 50 as shown in FIG. 5.

Turning now to step 34, the event begins with a presenter giving a talk, welcoming everyone and offering some insights and ideas. The talk is engaging and interactive, and presenters will call on users who have questions or virtually "raise their hands" and answer some questions and give a kind of pep talk. In the future, there may also be opening videos, powerpoint presentations, screensharing, etc as part of the beginning of an event. There may also be an author/thought leader/speaker who gives a talk on a particular subject.

Each event begins with an approximately ten-minute talk on the DEEPER DATING approach to finding love. Users then are broken into a series of breakout groups, and sometimes will be broken into pairs of two. The groups may be of different sizes. In groups, there may be equal numbers of men and women for opposite sex events and same sex groups for same-sex events. In opposite sex events pairs will be male-female, in gay/lesbian groups they will be same sex pairings. In these groups, they are given emotionally positive, engaging, fun questions for each participant to answer, questions that let them show their best selves, such as: "Tell about a favorite relative of yours as you grew up. Talk about a pet you loved. Tell about someone who has been a hero for you in your life." The question appears in a text box so all participants can refer to it. The questions will often relate to the talk that was given.

In each breakout group, participants get to see photos and/or live videos of each member of the breakout group. Platforms such as MAESTROCONFERENCE allow us to break the participants into random groups, allow participants to self-select into groups and allow us to create customized breakouts through polling. FIG. 4 shows an example of what a breakout group looks like on MAESTROCONFERENCE.

In between breakout groups, the organizer will sometimes pull everyone into a large group and have some interaction with them/ask for questions etc. This adds variety and gets people "up front" for everyone to see. There can also be powerpoint presentations, screen-sharing, and shared web-browsing. In the large (full) group, people get to see photos or videos of everyone who "comes to the stage" with a question or comment.

There may be various kinds of interactions in and out of breakout groups, including shared activities, self-chosen breakout groups, mingling, and more. There may thus be provided an application where participants can write themselves personal notes matched to each participant's profile so they remember who they are and who they are interested in. Such application may allow participants to rate, evaluate and make notes on participants of interest which will follow them throughout the event and after to help them to decide whom to contact after the event. In particular, utilizing such a "Notes" application as further described in this disclosure below, participants can, for example, add a checkmark for everyone they are interested in and write themselves personal notes matched to each participant's profile. These notes and the checkmark may remain on the person-of-interests profile after the event and there will be a continued functionality for people to keep writing notes about future interactions and the like, should they continue to interact together. Such preferences may be stored in database 106 along with their profile information.

In some events that are less structured and include more mingling, participants will exchange contact-information during the event.

Events may have a closing where people can share their thoughts and experiences in the main room, in front of everyone. These sections of the events are inspiring and usually people have lots of comments.

Figure 8:
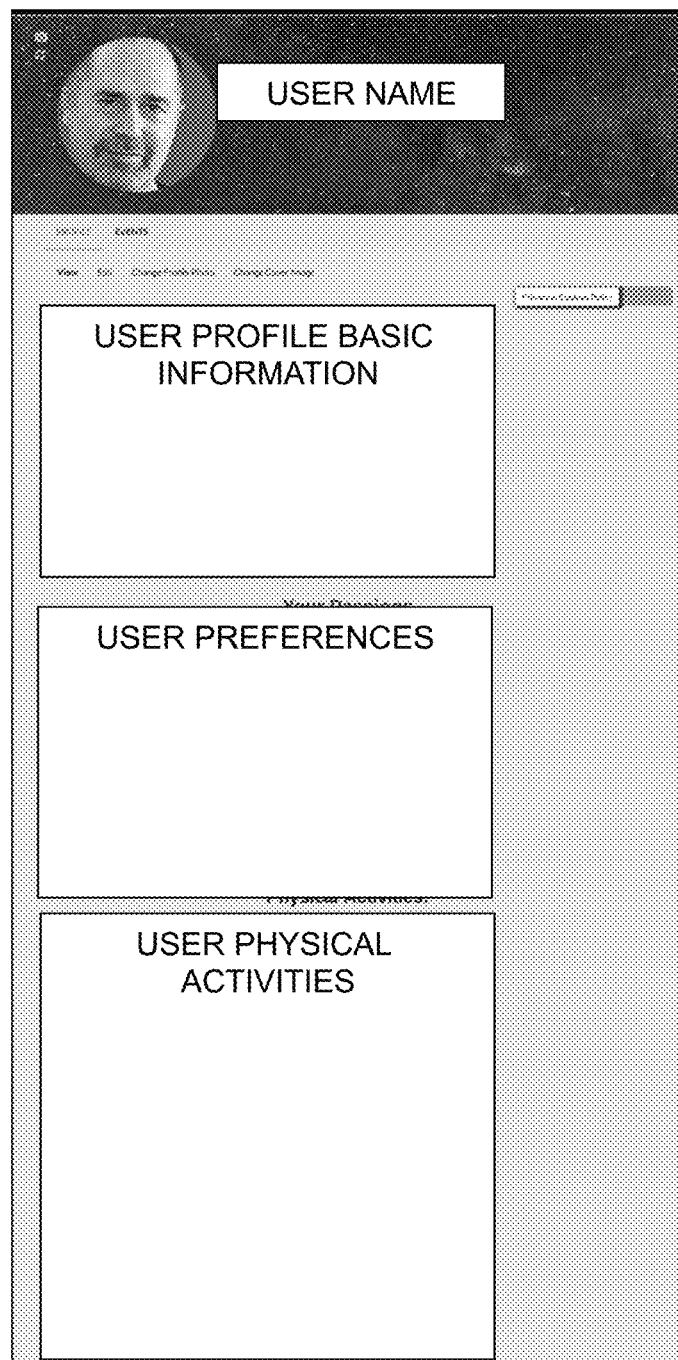
FIG. 8 is an exemplary user's profile page generated from the information entry page of FIG. 7.
Figure 9:
FIG. 9 is an exemplary public profile page generated from the information entry page of FIG. 7.

Turning now to step 35, after the conclusion of a live event, participants are encouraged to interact with other event participants via the DEEPER DATING online community. After the event, participants can go to a special section on the DEEPER DATING website where they will see all the members of their group and their profiles. Participants can learn more about them through their pictures and profiles, as well as seeing who they "checked" as potential people-of-interest using the "Notes" functionality described below, and they can interact through a safe direct-message type of format. FIG. 6 presents an example of a profile of a participant that attends the live event remotely or in-person. FIGS. 8 and 9 show (A) a full profile that doesn't show the NOTES functionality and (B) a profile section that does, respectively.

Participants will be able to read each others profiles, take part in forums in this group, and also interact through a variety of possibilities including direct-messaging, video-chat and more to connect and hopefully meet when it seems like a match (see e.g., FIGS. 32 and 33 and its related discussions below). Additionally, they will be able to connect to more information about DEEPER DATING organizers, and the work and books of the speaker in the live events.

Turning now to step 36, users may then interact with other features of the DEEPER DATING online community. There will also be premium subscriptions where users would be able to see and interact with all the people's profiles on the site, not just the ones who attended their event. Literature including books by the dating experts who speak in the live events will be available online, as well as opportunities to learn of other resources and join mailing lists on the subject.

In addition, there would be a library of all of the videos of lectures given in live events, and chat room type discussions around each video. This library will be a curated growing body of video and audio talks. Partnerships will be developed with various institutions and there would be a "hall" or section for each. For example, there would be publisher-specific sections, where all the talks by authors and speakers affiliated with a given institution would be housed, with cross-postings as needed. These talks would be used in DEEPER DATING online events in various locations (for example, an author of a new cookbook gives a talk on Chinese cooking, and this talk is used for a DEEPER DATING event in Tucson for single people who love to cook.)

Even if people didn't attend an event, they could see the videos, and could create forums for discussion around these topics which other members can comment on, and then meet that way as well.

There would also be a library of talks around dating and finding love for people who want to learn about my approach in a deeper way. There are provided chatrooms dedicated to these topics as well.

There will be a great synergy with the speakers too. They will get their books sold, and build their fan base, since these are people who elected to explore their area of expertise. These events will effectively be discussion groups on authors works. These authors would also publicize the event to their fan base including social media, such as TWITTER and FACEBOOK. These online events could be connected to online retailer booksellers, such as AMAZON. Links to buy the author's book may be provided and the operator of the DEEPER DATING website may receive a share of sales from selling of the book.

There are many other content areas on the DEEPER DATING website. For example, there may be a TWITTER-like section entitled "What are you doing now?" As with TWITTER, users may provide a short status message concerning their current activities. For example: "I'm about to go on a blind date. This guy sounds great on paper. Any suggestions?" "Second date. Guy cute. Want to kiss. His breath atrocious! What do I do?" "I think I really like this woman. Feeling insecure. Romantic dinner. Really want to enjoy her gifts, lead with mine."

Another section of the DEEPER DATING website may include a series of meditations and inspirational talks from speakers for every facet of dating: Before a first date, Going online to look, A Party, Making weekend plans, Sexual authenticity, Sexually-transmitted disease awareness, and Breaking up.

An additional section of the DEEPER DATING website may include moderated chat rooms, on a number of different subjects.

An additional section of the DEEPER DATING website may include DEEPER DATING wallpaper post-its that users can write or are written for them, that appear on user's display screens when they go online. One of those post-its is a list of the four guiding insights around online dating, one has a link to an upcoming YOUTUBE meditation to be done whenever users are about to go online to look for love.

An additional section of the DEEPER DATING website may include a MY DEEPER DATING DIARY to record personal thoughts and daily activities.

An additional section of the DEEPER DATING website may include User-generated content, focusing on a wide range of themes related to the DEEPER DATING approach but also to all the other content on the site. Curated comments from users about their work with each step. Every week, a selected user comment may be featured on the homepage presented to all users.

An additional section of the DEEPER DATING website may include a coaching section, with blogposts from DEEPER DATING coaches. Online coaching, SKYPE coaching, phone coaching, and in-person coaching opportunities are made available An additional section of the DEEPER DATING website, which may include advertising opportunities by sponsors will be possible at many junctures.

The technical implementation of the Enhanced Online Dating disclosed herein may include three main sections vis-à-vis user experience: the website, the social community, and the online dating events. For this solution to provide the best user experience possible, there should be seamless integration between all three of these sections.

The DEEPER DATING Web site may provide information about DEEPER DATING in-person or online events, including: information about its creator Ken Page, a landing page for his DEEPER DATING book, a DEEPER DATING Online page, which currently includes a place to sign up for events, a description of DEEPER DATING events and the past history, a section to sign up for the latest upcoming event, additional information will be added on this page, such as YouTube videos, FAQs, etc.

The current DEEPER DATING website may, in various embodiments, be built using WORDPRESS technology. BUDDYPRESS and WORDPRESS technologies may be used to house the online community and MAESTROCONFERENCE's social webinar (www.maestroconference.com), ZOOM or like technologies may be used as platforms, in order to allow an online event with breakout groups and participant pictures as described herein. DEEPER DATING may use another more sophisticated program for the online community, as well as other online meeting platforms that also offer this cutting edge technology, such as ILINC, NEW ROW and SHINDIG. The Enhanced Online Dating model is not limited to the use of a specific technology platform.

One of the most important parts of the Enhanced Online Dating Platform is the ability for participants of DEEPER DATING Online events to find and communicate with each other after the event. To provide this functionality, we started with BUDDYPRESS (an add on to WORDPRESS for social communities). Registration allows people to register on the website. When a user registers on BUDDYPRESS/WORDPRESS, they should receive a confirmation email to verify their registration. They will need to click on the verification link before they can enter the site. Sometimes, these verification emails don't get sent to the registered users so they cannot log onto the site. Several previous ways around this technological issue were to: (1) Force them from Pending Registration to Active Users (this is an option for BUDDYPRESS/WORDPRESS administrators); (2) Don't require verification (there is an option to override the need for verification. Once a user registers, they can immediately start using the social community features of the website. The only issue is that unwanted users might be able to register); (3) Use SMS or other ways to verify registration (An SMS verification might provide the best overall solution to prevent unwanted users from creating accounts, yet not holding up the overall registration experience. We have the ability to redirect to a web page after registration so any of these options can be easily integrated into the solution) (4) Logon to the DEEPER DATING Website (This allows for users to log onto the site to use the social community features. The BUDDYPRESS/WORDPRESS login process also allows for resetting passwords, etc.); (5) Creating/Editing Profiles (One of the key features of dating sites is the ability to find matches based on profiles. We modified the BUDDYPRESS look and feel and text in this area to make it more user friendly and aligned to our needs, including combining the Registration and Profile creation steps and pages. With the present disclosure, these previous technological issues have been overcome and resolved directly.

Initially, the user's required profile is kept simple to make the process quicker and easier for participants. Currently, participants are only asked to enter the following required fields (but we will be adding more in the future, such as Interests): First Name, Gender (including 'Other'), Interested in (including 'Other'), State (to assist with locating other users in your area), Self-Description (we also explain what this means during the process to help users enter the right information and profile picture. Once the initial registration is done, participants receive an email notice telling them that they need to complete their profile, and numerous new questions are asked. These questions are constantly re-evaluated to create the most optimized profile process. An example of a profile generated in this manner is depicted in FIG. 7.

Groups are key to the Enhanced Online Dating Platform since they are the place that is used to tie together the participants and forums (in-person or online) for each specific DEEPER DATING event. For each event, a group is created and all members that are registered for that event are added to the group. Members can be in multiple groups at the same time. Eventually, a premium subscription will allow members to see all other groups and be seen by members in other groups.

Participants are the users that are registered on the site for an in-person or online/live dating event. Each participant has an enhanced DEEPER DATING Profile that other participants will use to find and communicate with each other. For each event, a group is created and all participants that are registered for that event are added to the group. Participants can be in multiple groups at the same time. A premium subscription will allow members to see all other groups and be seen by members in other groups.

Forums allow members in a group to communicate with each other. For each event, a group is created and all members that are registered for that event are added to the group. Each group has a forum. In the Forum, members can post a message for others to respond to for all in the group to see. This is different than personal messaging/video conferencing, etc., where only the two members messaging see the messages. This functionality is currently available in BUDDYPRESS/WORDPRESS but is upgraded to provide a better look and feel.

Messaging allows members in a group to communicate with each other on an individual basis for only them to see. For each event, a group is created and all members that are registered for that event are added to the group. Members will be able to see a list of all members in their group and will be able to search on them. This functionality was previously available in BUDDYPRESS/WORDPRESS but had been upgraded to provide a better look and feel. This functionality can be replaced by our new integrated platform described further below, in which members are able to direct message through text and engage in (mutually approved) video-chatting or conferencing.

The last part of the Enhanced Online Dating Platform is the ability for participants of DEEPER DATING Online events to participate in the live event. During these events, members will need to be able to see and hear the other members in the event. This can be done via pictures with teleconferencing and/or webcams. Other functionality that is needed, includes: Polling, Breakout groups, Public announcements (including into breakout groups), Screen-sharing, White-boarding, and Embedding the meeting into our website.

To provide this functionality, we reviewed several of the top contenders, including: ZOOM, SHINDIG, MAESTRO-CONFERENCE, ILINC, and NEW ROW. Currently, even though each of them meets our basic requirements listed above, none of these solutions is perfect. We chose not to rely on one particular meeting platform since each one has its own benefits and drawbacks, and this field is constantly changing and expanding. Instead, we will use best-of-breed technology and will be able to easily swap out the online meeting event technology and fully integrate it into our new platform. Currently we use ZOOM because it is very popular, is easy for participants to use, is easy to scale, has a robust API and a host of useful features, and very clear video and audio. Unfortunately, it has no capacity to create breakout groups in advance (based on the groups that already have been pre-determined by the GROUPING GURU algorithm) so that they can be locked and loaded and ready to go when the event begins. As a result, we need to create each breakout group as pre-determined by the algorithm, in real time during the event, which is time consuming. There are a number of other deficits as well, which is why we are not permanently linking DEEPER DATING to any single meeting technology.

FIG. 4 is a screenshot of an enhanced online dating community welcome page 40 presented over the network environment of FIG. 1. FIG. 5 shows another possible configuration, which are not limited to just these examples provided.

FIG. 5 is a screenshot of an enhanced online dating community registration page 50 presented over the network environment of FIG. 1. Registration, confirmation and event information text 51 may be presented to a user via this page 50.

FIG. 6 is a screenshot of an enhanced online dating community profile search page 60 presented over the network environment of FIG. 1. Profile match search entry fields 61 may be presented on a display of the user's device to enter search requirements for profiles of other users. Users that participated in the same online or live dating event may also be provided on this page 60. Matching profile information text 62 may likewise be presented on this page 60.

FIG. 7 is a screenshot of an enhanced online dating community profile information entry page 70 presented over the network environment of FIG. 1. This page 70 may include profile completion instruction text 71, profile login entry fields 72 (such as username and password), profile information entry fields 73 and a profile picture 74. All the information from these fields may be stored in database 106 for each user and participant.

Various of the algorithms described involve the communication of data between devices. Any of a plurality of known communications protocols may be employed to accomplish these specially-programmed functions. An example of an HTTP protocol data communication request for data is as follows:

```
var http=require('http');
var options={host: 'www.deeperdating.com', path: '/in-
   tegers/?num=1&min=1&max=10&col=1&base=
   10&format=plain&rnd=new' };
callback=function(response)
var str="login_id";
response.on('data', function (check) {str+=check; });
http.request(options, callback).end( );
```

Various of the embodiments disclosed herein require the recall of stored data from a database or memory. Any of a variety of data protocols maybe used to accomplish these functions. An example of a SQL database query is as follows:

```
SELECT PARTICIPANT_ID, LAST_NAME
FROM PARTCIPANT_TBL
WHERE CITY='MANHATTAN'
ORDER BY PARTICIPANT_ID;
```

Each of the foregoing features have been further enhanced by the development of improved grouping algorithms as introduced herein to improve a computing system so as to accommodate rapid calculation of non-repeating groups of participants such that, for example, all participants meet each other at least once, depending on desired grouping outcomes.

GROUPING GURU, as introduced herein, refers to an algorithm that allows an administrator or other user to create close-to-optimal groupings based on a vast number of potential variables. One version of the programmed algorithm is provided in the attached Computer Listing Appendix as identified above, submitted herewith and incorporated herein by reference. The algorithm can create ongoing series of groupings from within a larger group (of almost any size) in a computationally efficient manner. An administrator can weight the various variables based upon importance. It also has the capacity to allow group participants to weight various variables according to their individual preferences.

GROUPING GURU is essential for DEEPER DATING online, but it also could have many other uses for any event that breaks people, subjects or even materials into groups for achieving goals, learning and connecting. It also could potentially be used as a grouping algorithm in manufacturing, inventory control, research and more. It simply and automatically creates the best groups of anything based on whatever variables the organizer wishes to match people or items by, and has vast flexibility to be customized to the needs of an almost endless array of uses. In terms of meeting functionalities, current online meeting technology doesn't allow anywhere near this kind of refinement. Any event that includes breakout groups could benefit greatly, including on-premise, in-person events.

Grouping algorithms must be able to work with the vast number of grouping possibilities, so large that "brute force grouping" is unrealistic and consumes inordinate processing power and network bandwidth. Therefore, DEEPER DATING may include algorithmic clustering techniques (which are capable of analyzing vast sets of data and creating close to optimal groupings) with the GROUPING GURU algorithm in order to create even more refined groupings. GROUPING GURU may include algorithmic meta-heuristic techniques, such as, for example, a Tabu Search, but may make use of any useful technique as is or becomes known in the art.

GROUPING GURU is capable of dividing people into close-to-optimal groups based on a large number of defining characteristics. However in some cases, even after categorizing the population based upon numerous characteristics, there may still be a large number of people who are evenly matched, since their answers are virtually similar. We have created a functionality for GROUPING GURU that can fix that problem should it arise and make it much more unique in the process, as follows:

In the case of a plurality of candidates having the same value range in the first round of matching, this condition may cause the system processor to generate an additional second level query focused on one of the primary categories to generate additional subcategories. This primary category is going to be selected out of the people who have uniform responses and therefore need further subdivision. It will either be based upon the category that has the most common responses, or will be selected randomly. An example of such a primary category would be "Humor" in an exemplary "Values" Column. This "Humor" section would now be where we would create a subcategory for the candidates to select or respond to. This will generate a second level matching algorithm value, i.e., the second level query value. This second level matching algorithm may be based on a selection by the participant of (a) one of a fixed group of sub categories, (b) a random selection of subcategory groups, or (c) a free form text entry as a response. An example of (a) above would be one question with a number of possible responses, e.g.: "What form of humor appeals to you most: comedy clubs." GROUPING GURU may use a brute force grouping technique until participant size reaches a threshold level, then it may switch over to a meta-heuristic technique to solve the problem, examples of both of which are illustrated herein.

GROUPING GURU, which again may be used for a wide variety of purposes, has been particularly customized to enhance DEEPER DATING functionality. DEEPER DATING online offers the dynamic authenticity of in-person dating events, with the inclusion of processes that facilitate enjoyable, fun, positive connections, and blend that with the efficiency, ease, and potential for large numbers of connections that online dating allows. To the best of our knowledge, there is no other dating event that does this. To help ensure the success of this new model of meeting, we need to make the process as enjoyable and simple as possible and optimize the possibility of positive matches as much as possible. We also need to minimize the possibility of frustration and disappointment for the participants. Especially in the emotionally charged arena of dating, breakout groups with faulty composition (such as a heterosexual event with breakout groups consisting of almost all women) can easily sour an entire event.

The following additional modules as described herein will significantly increase the effectiveness and ease of use for DEEPER DATING organizers and participants, reduce the possibility of frustrating and negative experiences, and allow the organizers of events to plan for group composition with a much higher level of refinement and accuracy that has previously existed, thereby creating more possibilities for positive matching based on a vast number of potential variables.

One main reason why DEEPER DATING Online stands out from other online dating events is its unique feature of small breakout groups. In the course of a single DEEPER DATING event, participants will take part in a number of different breakout groups, which enables them to meet many different people. This allows for dynamic interchange among members and a level of connection and communication almost unheard of in the world of online dating. At the same time, the breakout groups create a significant amount of challenge for the creators of DEEPER DATING because of the challenges inherent in creating breakout groups with optimum composition. For optimal group composition during the course of a DEEPER DATING event, four essential prerequisites need to be properly addressed, and without an effective algorithm, this would be nearly impossible.

The first prerequisite is to arrange for each breakout group to have the correct number of participants. In a DEEPER DATING event, the organizer would want to create groups of various sizes depending on a number of factors, which include the nature of the event and the activities that need to be done in each group. For example, breakout groups in a heterosexual event would need to be optimized so that the most time possible would be spent meeting members of the opposite sex. Therefore, the group size might be different than for lesbian or gay groups, for example. DEEPER DATING breakout groups would range in size from two and up to very large groups of participants. GROUPING GURU will break all participants down into groups of whatever size is chosen. All groups in each round would then be as close as possible to the same size based upon whatever mathematical and group composition factors are taken into account and selected. Different group configurations may likewise be employed.

GROUPING GURU can create each new round of groups either by the number of groups the administrator requires or the number of people in a group. If the administrator asks for a specific number of groups, GROUPING GURU determines the number of participants in each group. If the administrator requires a certain number of participants per group, GROUPING GURU determines the number of groups needed, as per the programmed instructions provided in the accompanying Appendix.

GROUPING GURU will also be able to create viable groups so that there won't be small runoff groups. Each group will be as robust as possible. For example, no group will be more than one less or one greater than any other group.

ZOOM, our current platform, does not allow for dividing into customized breakout groups through polling. Therefore, the GROUPING GURU algorithm will create optimal groups and an administrator will preform all of the participants/members into their upcoming breakout group in advance. This may also be programmed to happen automatically. For example, if we have 23 people and our optimal number of people per group is five, we would not do four groups of five and one group of three. We would do three groups of five and two groups of four.

The second prerequisite is to create breakout groups with the amount of non-duplication (or duplication) to the degree mathematically possible and as required by an administrator's requirements, the participants' requirements or preferences, and the participants' characteristics. Please note because this is for a live event, GROUPING GURU may assume that no one person can be in more than one group at a time.

Regarding duplication or non duplication, the options available for an administrator are: allow duplicates or do not allow duplicates. There may be two options under "do not allow duplicates," strict and loose. Strict means absolutely no duplicates whatsoever. Loose means run-through the process fully to create the groups with no duplicates. Then, if not all rounds are completely full, run through the process again filling in the non-full rounds with duplicates.

The third prerequisite as mentioned above is to create breakout groups with as close to optimal matches as possible between group members to the degree mathematically possible and as required by the administrator's requirements, the participants' requirements or preferences, and the participants' characteristics or attributes. GROUPING GURU allows almost limitless groupings, creating groups where as many attributes, interests, likes and dislikes are shared as possible based on the above.

GROUPING GURU can handle many different types of matching of attributes for group members, including at least the following seven:

1) Simple: Simple matching is just comparing the same attribute amongst all of the universe of possibilities. An example would be "Likes Sports." I like sports so I have a "Yes" for that attribute but the person I'm looking at has a "No" so it's not a match. If there's a match the full score is given, if there is not a match there is an equal negative full score given. If it's also a showstopper and not a match, the (very large) maximum negative score is given.

2) Contains Category Singular: A set of things that can be matched against by GROUPING GURU. Only one category needs to be matched. An example would be gender: I am a male and I am looking for a female. If there is a match, then the full score is given. If there is not a match, then the negative full score is given. If it's also a showstopper and not a match, the maximum negative score is given.

3) Contains Category Multiple: There is more than one category that can be a match. You can match to several of those categories. For example, you might have "Sincere", and "Outgoing" in a "Qualities Interested In" column and then compare that column against a "My Qualities" column for the other member. They might have "Outgoing", and "Funny" in their "My Qualities" column, so there will be only one match (i.e. Outgoing). For each match, you get the full score. If there are no matches, you get the negative full score.

4) Spread Category: There may be a list of categories in a specific order. For instance, age categories. The spread comes in because it's measured by how far away it is from the one that you want it to be. For instance, if you're looking for somebody between the ages of thirty-six to forty, and someone is between thirty-six and forty, it's a match. But if the other person is between forty-one and forty-five (or thirty-one to thirty-five) it would be scored with a lower number. And if they are between forty-six and fifty it would be an even lower number.

5) Age: Age can be handled in three ways.
   a) Closest in age: This is the default if no age is given. The member with the closest age to the current member (or the age provided)—either higher or lower—gets the full score. The member whose age is next closest gets the full score minus the full score/N (where N means total number of members) For example, if there are one hundred members, the person with the closest age to the participant gets a score of one hundred. The second closest would get a score of, say ninety-nine. The third closest would get, say ninety-eight, etc. The furthest away gets a score of zero. People with the same age will get the same (higher) scores. GROUPING GURU may simply compute the difference in ages between the current profile and the profile it is being compared against. After all of the age difference comparisons are computed for the current member to every other member, the percentage of each member's age difference is computed against the highest to lowest. That percentage age weight may then be used to give the score for that member's age to the other member's age.
   b) Within one age range: If the member prefers someone within a specific distance from their age (or an age provided) in either direction, everyone within that distance would get the full score. Anyone outside that age distance would get the negative full score. For example, if someone is 30 and requests no more than a 5-year distance in age, everyone from 25-35 would get the full score. Everyone under 25 or over 35 would get the negative full score If the member requires someone to be within a certain age range by marking this attribute as a "showstopper", anything outside of that range would be given the maximum negative weight.
   c) Multiple Categories of age ranges: If the member provides several age differences that are acceptable, then any member within the first chosen age difference will get the full score. If anyone is within the second age difference, they will get the full score—full score/n (with n being the number of age-differences provided). This process continues until the last acceptable age difference. If a members age difference is outside the last category, they will get a score of zero. For example, a member might be thirty-five years old (or would prefer someone thirty-five years old) and would prefer to date people that are five years younger or older but they would accept dating people that are ten years older or younger. They would provide the numbers five, ten so that anyone within five years would get the full score while anyone that is between five-ten years age difference would get half of the full score (full score—full score/N, with N being the amount of numbers given), while anyone more than ten years older or younger would get a score of zero.

6) Zip: Physical distance can be handled in three ways: (Note: GROUPING GURU uses US Zip codes to compute the distance of 2 members, although international postal codes or any other useful geographic identifier may likewise be used.)

i) Closest zip code: This is the default if no chosen distance is given. The member with the closest distance gets a score of the full weight. The member whose distance is next closest gets the full weight minus full weight/N (where N means number of participants) For example, if there are one hundred members and the full weight is one hundred, the member within the closest proximity gets the full weight, say one hundred. The second closest would get, say, ninety-nine. The third closest would get, say ninety-eight, etc. The farthest away gets a score of zero. Members the same distance away will get the same scores. GROUPING GURU may determine the physical distance between all members and the current member (or the zip code provided). After all of the age difference comparisons are computed for the current member to every other member, the percentage of each member's age difference is computed against the highest to lowest. A percentage location weight may then used to give the score for that member's location to the other member's location.

ii) Within one distance: If one maximum preferred distance is provided, then any member up to that distance will get a score of the full weight and anyone above that distance will get a score of negative the full weight. For example, if a member requests no one more than a five-mile distance from that member, every member less than five miles away would get a full score. Every member over five miles away would get a negative full weight score.

If the participant requires someone to be within a distance range by marking this attribute as a "showstopper", anything outside of that range would be given an extremely high negative weight.

iii) Multiple Categories of distances: If several acceptable categories of ordered distance are provided, then any member within the first closest distance to the members zip code (or zip code provided) will get a score of the full weight. Any member within the next distant will get the full weight minus full weight/n (n being the number of categories of distance which are allowable). This process continues until the last allowable category of distance. If a member is farther than that last allowable category of distance, the score will be zero.

7) Word Weighting: The text description is parsed to find key words. Then the key words are compared to find the ones with the most matches. It may use the exemplary Stopwords worksheet described herein to parse out common words that are found in sentences. It then finds any other words and marks them as keywords. In the end, the text that was in this field is converted into comma-delimited, quoted strings that can be compared against other word weighted fields. Each time there is a match with another profile, the weight is added to the raw score, so if there are three word matches, then it receives a score of, say, three times the weight.

The fourth prerequisite as mentioned above is to create groups with uniform proportionality of group composition to the degree mathematically possible, and as required by the administrator's requirements, the participants' requirements or preferences, and the participants' own characteristics (i.e., all the various determinants of group composition). For example, in heterosexual events, GROUPING GURU would ensure that each breakout group has representation of men to women in close to equal ratio to the number of men and women in the overall event. Therefore, if a DEEPER DATING event has one hundred participants in total, of whom sixty are women and forty are men, each group would strive for a 60/40 ratio between men and women to match the overall group ratio of men to women. This is handled by putting a heavier weight on this profile attribute.

This function can be used to constitute "intragroup homogeneity" and "intergroup heterogeneity," which is often an optimal formula for grouping, allowing for variety within each group and uniformity of that variety across groups to the degree possible.

A Grouping Algorithm as disclosed, sometimes referred to herein as GROUPING GURU, accomplishes each of the four above essential prerequisites. In addition to the above essential prerequisites, GROUPING GURU significantly improves the quality of the whole experience by placing people with shared interests and values in the same groups as frequently as possible. This may be done by using correct weighting on these profile attributes.

Also, in addition to just matching people based on similar interests and values, GROUPING GURU lets participants weight their values and interests based on their personal importance, and wherever possible optimally matches breakout group members by giving increased preference to the more heavily weighted items. This maximizes the potential for user satisfaction and might even help increase the chances of better dating matches. Of course, the organizer also needs to be able to create weights for different composition variables, at a higher level (such as weighing gender and geography highly).

GROUPING GURU uses profile information and filters all participants for the best compatibility based on as many or as few participant characteristics as desired, which can be weighted by the site administrator, as well as each user. Accordingly, in each user's profile, they need to note their interests which include hiking, camping, singing, volunteer work, and many more. They also list the values that are the most important to them. And they get to weigh many of these variables in terms of importance, which then is filtered into the algorithm.

Then, GROUPING GURU automatically creates the most optimal small groups, with each group optimized to have members with the most compatible traits, shared interests, and with the most compatible values. It sorts and groups participants based upon participants' numerical, quantifiable self-description and numerical, quantifiable description of the kind of person they are looking for. It then goes further, refining the group composition even more by taking into account the weight of importance placed upon the different interests and values, as determined by each participant.

And again, in addition to the above, GROUPING GURU defends against possible repeats as much as mathematically possible. Prior algorithms for group composition typically have not offered many options for matching and do not protect against repeats when there are a series of many small groups in a row within a larger group. With the GROUPING GURU functionality, optimization of each grouping for non-duplication and for the greatest amount of shared interests and shared values is provided. The GROUPING GURU algorithm does not promise to predict good romantic matches, however. It simply optimizes the chance for people with shared interests and other forms of compatibility to be placed in the same small groups.

Organizers of DEEPER DATING Online or of other events which utilize GROUPING GURU can easily add in more profile attributes and plug them into GROUPING GURU. It is highly flexible in this way. Everything in GROUPING GURU may be configuration driven so the user has total control over the grouping configurations they desire.

Some technologies that offer breakout groups have a low level of functionality for creating different group compositions based on polling. Participants might press "one" if they are male and "two" if they are female, and then the technology will allow the people to be placed into groups with relatively equal numbers of males and females. However, this level of technology does not defend against having as few repeats as possible as participants continue to enter into new breakout groups and meet new people. To the best of our knowledge, no online dating sites/venues/events come close to offering this level of sorting for a live event.

Currently, DEEPER DATING is highly flexible in this way. Prior technology for online video streaming has not allowed for any high level sorting either. Therefore, at a ZOOM event hosted by DEEPER DATING, GROUPING GURU now integrates and assesses the profiles of all participants before the event, and pre-creates exactly as many groups with exactly as many participants as needed for a particular event, all while filling each group with the most optimally matched members based on the profile-based data. Using ZOOM technology, an assistant will manually need to prepare the new small group that is upcoming after the first group ends. This is challenging, but do-able. As ZOOM further develops its Application Programming Interface (API), or as we work with a different provider, it may be possible to pre-load or determine all the groups created by GROUPING GURU in advance, which would be more computationally convenient. But because the technology is growing all the time, the disclosed algorithm and our events do not presently depend on the existence of such functionality, though it is readily contemplated that it can be integrated where and when available. Integration with ZOOM or other videoconferencing is described in more detail later below.

Figure 10:
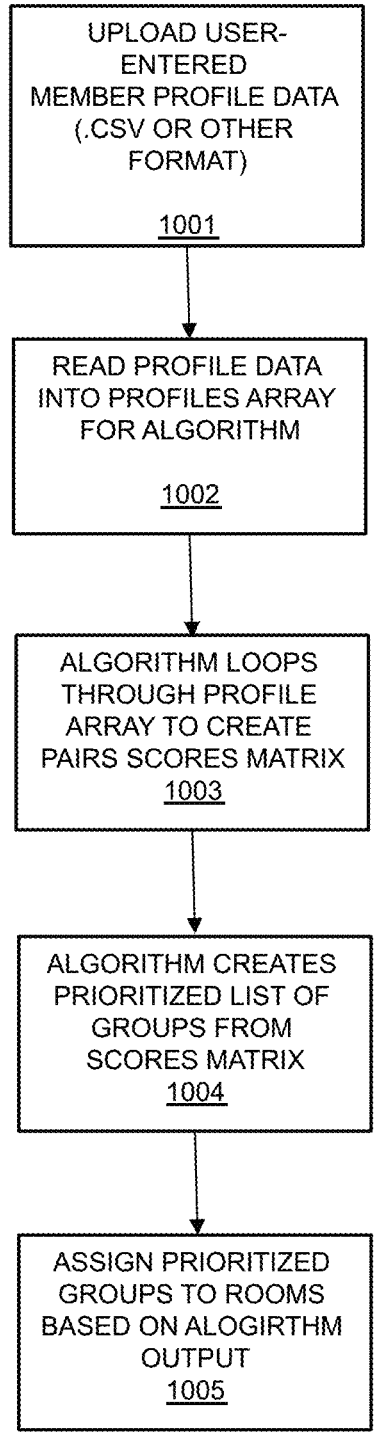
FIG. 10 is an exemplary flowchart for a general improved grouping process performed exclusively by the network environment of FIG. 1.

Turning now to FIG. 10, therein is depicted a general grouping process 1000 for implementing an algorithm to efficiently and accurately group meeting participants, or other items. This algorithm is used to create optimal groupings of profiles based upon criteria set by the administrator and users of the system. The initial purpose of the grouping algorithm disclosed herein was for DEEPER DATING Online meetings, but it has expanded to be a general purpose grouping algorithm suited for a wide variety of purposes across many industries or purposes. The general grouping process 1000, as performed exclusively by a specially-programmed processing system, proceeds as follows:

The process 1000 commences at step 1001, where the DEEPER DATING online system, or other processing system, reads in, i.e. uploads, a set of profile information provided by one or more users. The data may be entered in a Comma Separated Value (.CSV) file or other data format file.

Next, at step 1002, the profile data is read into a profiles array for use by the algorithm. One possible layout for the profile array of data is shown in FIG. 13, as discussed later below.

Continuing to step 1003, each profile is compared against each of the other entered profiles array of other users to come up with a raw score for each pair of users, which may be stored and mathematically employed in a matrix array format. One possible layout for a raw_matching_score matrix of data is shown in FIG. 17

The score for each pair may be computed by determining the match of each of the attributes of one profile against the attributes of the other profile in the pair of profiles being compared. Processing instructions for performing this are provided in the attached Computer Listing Appendix as referenced above and incorporated herein in relevant part. However, in general, mathematical weight values are programmed for each attribute so that the more important attributes will have higher relevance in the overall score for each pair being compared. There is an option for an attribute to be a "showstopper," i.e., a user-designated, most-important attribute, so if such an attribute in a profile of the pair doesn't match the other, then a maximum negative weight may be assigned to the pair accordingly. Once all the scores for each pair are computed, they are stored in, for example, a square matrix array.

Next, at step 1004, a sorted, prioritized list of groups is then created using the assembled matrix of pair scores. The score for the group is based upon the scores for every possible combination of pairs in the overall group. The number of members per group is either programmed in advance, or may be determined, for example, based on the number of profiles entered. This sorted list of groups is then used to put separate groups together to make sure that every profile is in a group for each round. If there are multiple rounds, then each subsequent round will attempt to avoid having any duplicate profiles in any group, as may be desired by the administrator running the algorithm.

Finally, at step 1005, the output from running this algorithm is a list of groups that belong together for each round. Such groups may then be assigned physical locations, rooms, tables, spaces or the like, at specified times, as may be established for the live event.

Figure 11:
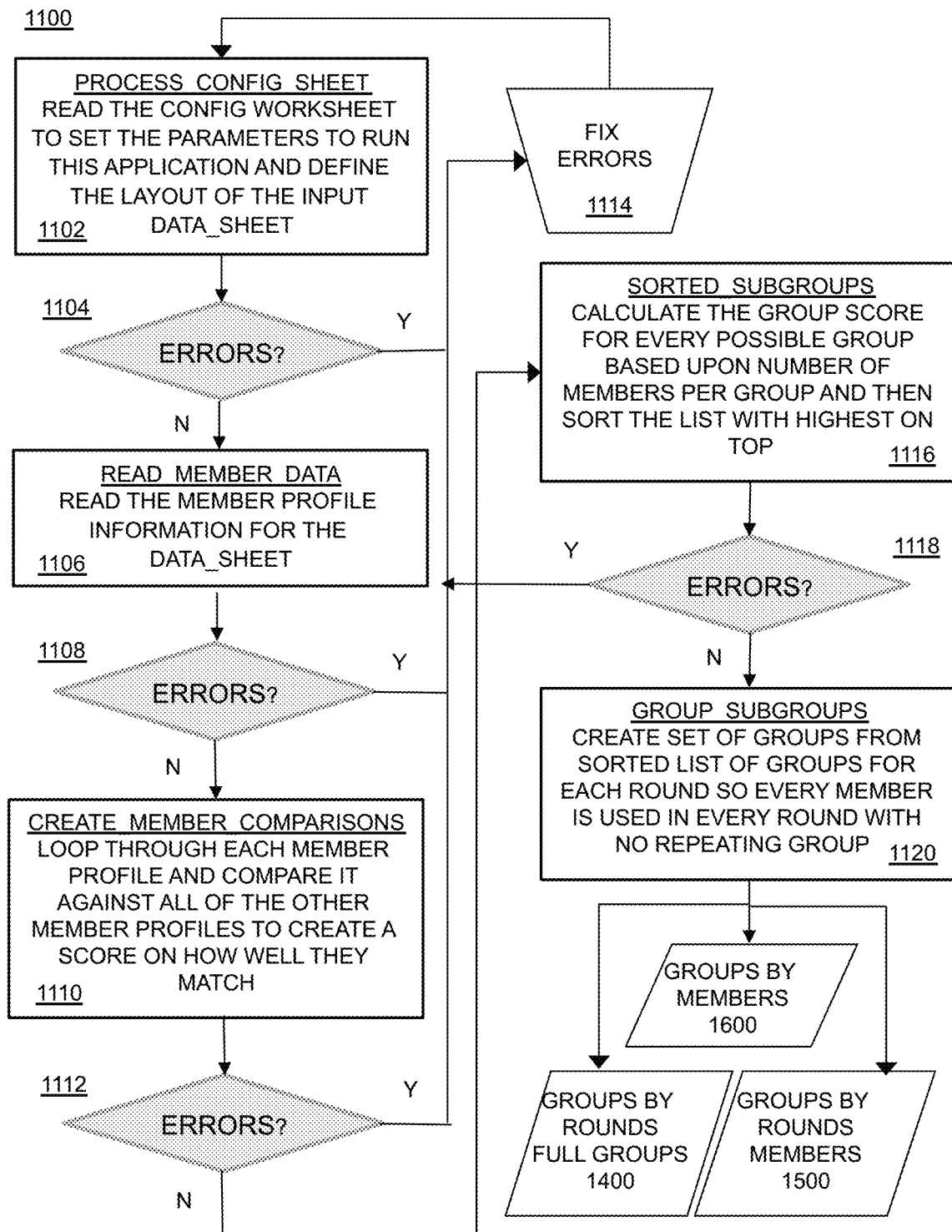
FIG. 11 is an exemplary flowchart for a specific improved grouping process performed exclusively by the network environment of FIG. 1.

Turning to FIG. 11, there is depicted a specific grouping process 1100 for implementing an algorithm to efficiently and accurately group meeting participants, or other items. In implementation, the process 1100 may make use of any of a variety of data file formats and database types. For purposes of description herein, the process 1100 is described with respect to inputting and maintaining data through a variety of exemplary spreadsheets or worksheets, though other available formats and file types are readily contemplated. Accordingly, in one embodiment, the following worksheets may be established and used: A Configuration Worksheet 1200 and an Input Data_Worksheet 1300 as described below.

A Configuration Worksheet 1200 is used to set all of the parameters that are needed to group participants or the like in processing a grouping "run." An example of a suitable Configuration Worksheet 1200 is shown in FIG. 12. The Configuration Worksheet 1200 sets the parameters for running the Grouping Algorithm, such as the number of grouping rounds, the number of members per group, whether to allow repeats within one or more groups, and other parameters as described or suggested herein as well as other desirable parameters. Such additional columns may include a Refinement Column and a Proportionality Column, which may provide respective values for Refinement and Proportionality functions as described later herein. The Configuration Worksheet 1200 may also be used to define the layout of an Input Data_Sheet Worksheet 1300 described herein below with respect to FIG. 13, by defining what is in each column, defining how columns are related to each other for comparisons and calculations, and setting any default values for any information that may be missing from a member's users profile for importance weighting and the like. The Configuration Worksheet 1200 may have the following attributes and exemplary values, as noted in the following:

Attribute "Data_Sheet" is the name of the data sheet that contains the details about the members to be grouped. It has a default name of "Data_Sheet" but any name may be used. Its values include member profile information for all members to be grouped and regrouped.

Attribute "Number_Of_Rounds" provides how many rounds of grouping are to be performed. The default value is "1" but any number of groupings may be readily accommodated.

Attribute "Number_Of_Groups" is the number of groups that are needed for each round. (NOTE: Should be empty when attribute "Members_Per_Group" is preset. The Grouping Algorithm will determine how many members to put in each group based upon this and total members.) At least one group will be formed, so the default value may be one, but any number of groups suitable for the number of members may be employed.

Attribute "Members_Per_Group" is the maximum number of members needed for each group (NOTE: Must be empty if attribute "Number_Of_Groups" is preset. The system will determine how many groups to create.) An exemplary value is "4."

Attribute "No_Repeat_Groups" is a Boolean logical value that may be set to TRUE when there are to be no groups that have any repeating members or FALSE when repeating members are allowed.

Attribute "No_Repeat_Groups Preference" can be set to value "FALSE" to allow duplicates. "LOOSE" to only allow duplicates after first finding non-duplicates, or "STRICT" to never allow duplicates.

Attribute "Allow Suboptimal Groupings" can be set to TRUE if suboptimal groupings are allowed as a last resort. This could be could occur where, for example, there are more women than men in a heterosexual dating event. Otherwise, the value is set to "FALSE."

Attribute "Output_Order_Preference" can be set to the following values: "Ascending" to show the rounds with the best solutions first, going down in order; "Descending" to show the round with the least best solution first, then working up to the best solution; or "Random" to have no specific order for the rounds, with order determined by a pseudo-random number generator.

The Input Data_Sheet Worksheet 1300 may contain all relevant member profile information, which can be entered directly or through an application like VISUAL BASIC that can be used to output the member profile information into the Input Data_Sheet Worksheet 1300. The layout of the Input Data_Sheet Worksheet 1300 may take any of a variety of desirable formats as defined by an administrator or programmer. The Input Data_Sheet Worksheet 1300 should have one header row for identifying the relevant portion of member profile information. The number of columns employed is not limited, however, columns that are unused by the Grouping Algorithm may be ignored. Each member's profile information is preferably represented in a single row under each of the columns and member profile information may be presented in any useful order (such as alphabetical by last name of the member). An example of the Input Data_Sheet Worksheet 1300 is shown in FIG. 13, with explanations of the contents of each successive row displayed therein as follows:

Row 1: Header Row for the Column names that are used in the Configuration Worksheet 12000 to match the various Member_Attribute types as programmed.

Rows 2-9: Exemplary member profile information for a grouping run, of which:

Row 2: attribute "age_interested_in" may contain a date value. In such case, all date comparisons are used against this date (1/1/1990) as opposed to the Birth Date of 4/24/1999). This may be used when the member is looking for someone of a certain age instead of an age closest to their current age.

Row 2: attribute "location_interested_in" may contain a U.S. zip code value. In this case, all location comparisons are used against this zip code (i.e. "10001") as opposed to their location (i.e. "90001"). This may be used when the member is looking for someone in a certain location as opposed to their own. For making such determinations, a Zipcodes Worksheet 1900 may be provided, which contains all of the US Zipcodes along with their latitude and longitude, for purposes of calculating distance between members, as many members may specify preferred distances for a potential match in their member profile information. As example of a portion of the complete Zipcodes Worksheet 1900 is shown in FIG. 19.

Row 3: Attribute "age_interested_in" may contain a single number value. In the case of dating profiles, any member's age in their profile that is +/−five years from the current members profile will get the full score on the match, or else, they will get the negative full score.

Row 3: attribute "location_interested_in" may contain a single number value. In this case, any member's location in their profile that is within fifty miles from the current members location will get the full score on the match, or else, they will get the negative full score.

Row 4: attribute "age_interested_in" may contain multiple, comma-separated, ascending number values. In such case, any member's age in their profile that is +/−five years from the current members profile will get the full score on the match, any other members age that is between, say, five and ten years away will get a score of, i.e., "50" (namely, ½ weight of 100), or else, they will get the negative full score.

Row 4: location_interested_in contains multiple, comma-separated, ascending numbers. In this case, any member's location in their profile that is 50 miles from the current members profile will get the full score on the match, any other members location that is between 50-75 miles away will get a score of 125 (½ weight of 250), or else, they will get the negative full score.

Row 5-9: Shows the case where nothing is entered in the Age Preference or Location Preference columns. In such case, the score used by the Grouping Algorithm may be determined proportionally according to where it falls within the smallest to largest differences. For instance, if it's an Age Preference, all differences are determined from the date in the current member compared to the date of the comparison member. The weight value employed may be determined by where this age falls between the lowest and highest of the age differences. For example, if the largest age difference is ten years and the smallest is one year, then an age difference of five years may get 50% of the weight. In case of conflicting entered information, any information in the Age Preference or Location Preference columns that is provided in this Input Data_Sheet Worksheet 1300 for a member profile may take precedence over what is provided in the Categories Column of the Configuration Worksheet 1200. A similar schema may apply to other columns as desired.

The Member_Attributes, used to define the layout of the Input Data_Sheet Worksheet 1300, will now be described in more detail. Each Member_Attribute describes a column in the Input Data_Sheet Worksheet 1300. In the example described herein, each Member_Attribute row has seven columns of information, though it is readily contemplated that any number of useful columns may be employed using the techniques describe herein. The seven exemplary columns are as follows.

(1) An "Age" type may use a member's birthdate to determine a match. There are many possible options for this field, including the following four:

- (i) No value: If there is no value in this field, the algorithm will just compute the difference in ages between the current profile and the profile it is being compared against. After all of the age difference comparisons are computed for the current member to every other member, the percentage of each member's age difference is computed against the highest to lowest. A percentage age weight value may be used to give the score for that member's age to the other member's age.
- (ii) Date Value: If a date is provided, then the current member profile is looking for a match close to a specific date as opposed to their date of birth. Everything else is done as discussed above for the "No Value"
- (iii) Number Value: If a single number is provided, then the current member profile is looking for a match whose age is within that many years (above or below) their current age. If the match is within that range, they get the full score, if not they get the negative value of the full score.

Note: If the Age column is marked as a "Show Stopper" by a member, then the maximum negative score will be given to a member pair if the Age value of a potential match falls outside the range.

- (iv) Ascending Number Values: If multiple, ascending, comma-delimited numbers are provided, then the current member profile is looking for a match whose age is within that many years (above or below) of those ranges to their current age. The first number may be the preferred range and any profile within that range will get the full score. The second range will get a lower score, etc. down to zero for anyone outside of the last range. If the match is within a range, they get a score of the full score—(full score/n), with n being the number of ranges. For instance, if there are two ranges, five and ten, and the full weight value is "100," any profile age+/−five years of the current member profile age will get a score of "100," any profile age+/−ten years will get a score of "50," while all other profiles will get zero. In addition to the above options for the Age column, age values can be handled as a string instead of an Age type. For instance, it can be a Spread_Category Type with ranges as strings.

(2) A "Contains_Category_Multiple" type may contain an item (or several items) that the current member profile is looking for in the other member profiles. For example, the current member profile might have "Sincere", "Outgoing" in a "qualities interested in" attribute which is then compared to the similar "my_qualities" column for the other member profiles. Another member profile might have "Outgoing", "Funny" in their "my_qualities" attribute, so there will be a match. The Grouping Algorithm will compare all of the qualities wanted in the current member profile versus all of the qualities the other member profile has. For each match the full score is given. If there are no matches then the negative full score is given. Note: If this column is marked as a "Show Stopper," then the maximum negative score will be given.

(3) A "Contains_Category_Singular" type may contain an item (or several items) that the current member profile is looking for in the other member profiles. This is similar to "Contains_Category_Multiple" column, except it is only looking for one category match, not multiples. For example, the current member profile might have "Male" in a "gender_interested_in" attribute and then that attribute is compared against a gender column for the other member profile, and when it's "Male" there is a match. If there is at least one match then the full score is given. If there are no matches then the negative full score is given. When this attribute is marked as a "Show Stopper" by a member, then the maximum negative score will be given when there is no favorable comparison.

(4) A "Simple" type may contain a simple data item like a string or number that is matched against the same column. (e.g, If "Likes Sports" is a column and one member has a "Yes" and the other person has a "No", then it is not a match for the other member.) If they match then the full score is given. If they don't match then a negative full score is given. If this column is marked as a Show Stopper, then the maximum negative score will be given when there is no favorable match.

(5) A "Spread_Category" type may contain an item in a category of items that the member is looking for in the other members. If it's not an exact match, then the next category to it will be the second best score, etc. For example, a member might have "36-40" in an age_interested_in column and then compare that column against an age column for the other member and if it's "36-40" there is a match. When instead, their age category is "41-45" or "31-35" then it is one distance away, or if their age category is "46-50" or "26-30", then it is two distances away. The differences in scores are determined proportionally by how many categories there are.

(6) A "Word_Weighting" type is used for finding matching words in text descriptions. The text description is parsed to find key words. Then the key words are compared to find the ones with the most matches. This column uses "Stop Words" to parse out common words that are found in sentences that designates, for example, qualities that a member wishes to avoid in a potential match. It then finds any other words and marks them as keywords. In the end, the text that was in this field is converted into comma-delimited, quoted strings that can be compared against other word-weighted fields.

(7) Finally, a "Zip" type may contain the location field that contains each members' U.S. zip code. There are several different options to handle zip:

- (i) When there is no value entered, the Grouping Algorithm determines the physical distance between all members and the current member. The member with the least distance gets the highest score, the member with the next least distance gets the next highest score. This continues until the member with farthest distance, who gets a score of zero. Any ties in distance will get the same (higher) score. After all of the age difference comparisons are computed for the current member to every other member, the percentage of each member's age difference is computed against the highest to lowest. A percentage location weight may be used to give the score for that member's location to the other member's location.

(ii) Zip Code: If a zip code is provided, then the current member profile is looking for a match close to a specific zip code as opposed to their zip code. Everything else is done as discussed above for the "No Value"

(iii) Number Value: If a single number is provided, then the current member profile is looking for a match whose location is within that many miles from their zip code. If the match is within that range, they get the full score, if not they get the negative value of the full score. If this column is marked as a Show Stopper, then the maximum negative score will be given when a comparison is outside the range.

(iv) Ascending Numbers: If multiple, ascending, comma-delimited numbers are provided, then the current member profile is looking for a match whose location is within that many miles of those ranges to their zip code. The first number is the preferred range and any profile within that mile range will get the full score. The second range will get a lower score, etc. down to zero for any profiles whose zip code is outside of the last range. If the match is within a range, they get a score of the full score–(full score/n), with n being the number of ranges. For instance, if there are two ranges (i.e., five and ten) and the full weight value is set at "100," any profile's zip code that is within five miles of the current member profile age will get a score of "100," any profile zip code between five and ten miles will get a score of "50," all other profiles will get zero. In addition to the above options for the "Zip" column, a location can be handled as a string instead of a Zip code. For instance, it can be like the "Simple" column above with a string for state abbreviation such that anyone in the same state will get the full score.

The Input Data_Sheet Worksheet 1300 may also include the following eight additional fields:

(1) a "Primary Key" field may be set to TRUE if this is the primary value in the Data_Sheet (Note: there must be one and only Primary Key in each Data_Sheet in this embodiment). Otherwise, the field may be set to FALSE.

(2) a "Show Stopper" may be set to TRUE if this column is designated a Show Stopper by a member, such that the value MUST be matched for it to be a successful match, to the exclusion of all other attributes. Otherwise, the field may be set to FALSE.

(3) a "Proportions" field may be set to TRUE if this field is used to maintain proportions in the groups that are created based upon the user profiles that are read in. (Note: only one column can be TRUE in this embodiment), For instance, with respect to gender, if the user profiles are 75% women and 25% men, then the groups will be approximately 75% women and 25% men.

(4) a "Refinement" field may be set to TRUE if this field is used to break ties in similar scores. (Note: there can only be one field set as the Refinement column in this embodiment). When the Refinement column is set, if there are many groups that have a same score (i.e., 10% of the possible groups) then this column will be used to determine how to refine the profiles. This is done by finding the largest run with the same scores, then finding out which profiles were used in that run, then finding the most common category in the refinement field for those profiles in that run. The Grouping Algorithm then lists in a Refinement worksheet (not shown) those profiles that use that most common category. This information is then used by the administrator to request more information from those users. This information is then added back into the Input Data_Sheet Worksheet 1300 and when this grouping is run again, this should break the ties of those profiles in that run.

(5) a "Default Weight" field may provide the default weight for this match if it is not specifically set. Weights can be set in the member profiles by members themselves, but when not done, the Default Weight will be used, as programmed.

(6) a "Weight Column Name" field is the column name that holds the member's profile weight for this match. If this field is empty, then the Default Weight will be used instead.

(7) a "Comparison Column" field may contain the column name that determines which column to compare against which other column among member profiles If it is blank, then the same column name will be used for comparison by default.

(8) Finally, a "Categories" field may be provided for a Spread_Category. This may be a required field in order to determine the spread between the comparisons. The categories must be comma-delimited, quoted strings, sorted IN-ORDER, since their location from each other determines how close of a hit. For Age Preference and Zip attributes, this field contains the default set by the administrator when the member profile does not set a default. It can be a number or set of comma-delimited, ascending numbers. For other attribute types, this may be an optional field.

Once the Configuration Worksheet 1200 and the Input Data_Sheet Worksheet 1300 have been established, the Grouping Algorithm may be run, resulting in, for example, three output worksheets. A Full_Groups_Sorted_By_Round Worksheet 1400 holds the results of a run, with each row containing the round number, assigned group number within each matching round, all of the members assigned to each group, as well as (i) the calculated rank number determined for each group and (ii) the rank percentage of the match between each group member of a group for compared columns of member profile data. An example of the Full_Groups_Sorted_By_Round Worksheet 1400 is shown in FIG. 14. A Groups_Sorted_By_Rounds Worksheet 1500 holds the results of the run with each row containing the round number, group number and name, as displayed for each member in each group. It also contains the rank and rank percentage for each individual member, as described immediately above. An example of the Groups_Sorted_By_Rounds Worksheet 1500 is shown in FIG. 15. Finally, a Groups_Sorted_By_Members Worksheet 1600 holds the results of the run with each row containing the member name, round number and group number, with one row for each member in the group. An example of a Groups_Sorted_By_Members Worksheet 1600 is shown in FIG. 16. These three different worksheets 1400-1600 are created to make it easier for an administrator to have output information in a variety of different useful forms, and may be configured in many different useful ways from the examples provided herein as will be readily apparent to one of ordinary skill in the art. If the output groupings are not desirable for some reason, the assigned weightings for each piece of the member profile information may be changed to produce more desirable results. For example, weightings may be increased to emphasize one comparison based on importance assigned by the administrator or the members.

In addition to the above three output worksheets 1400-1600, additional output worksheets may be generated as desired. For example, referring to FIG. 17, a Raw_Matching_Scores Worksheet 1700 contains raw matching scores calculated by the Grouping Algorithm for each potential pair of members. Each member is assigned a singular row and corresponding column along a diagonal of the matrix of possible groupings within the Raw_Matching_Scores Worksheet 1700. For example, the first member is assigned row #0, column #0 along the main diagonal of the matrix array, the second member is then assigned to row #1 and column #1, the third member is assigned to row #2 and column #2, and so on for each available member. The calculated raw scores as computed for each possible pair of members is then placed in a corresponding row and column number corresponding to the positions of the members along the matrix. For example, the raw_matching_score generated by the Grouping Algorithm for the first member above and the second member above, based first of the preferences of the first member may be placed in Row #2, Column #1, while the raw_matching_score based on the preferences of the second member may be placed in Row #1 and Column #2 in accordance with their relative positions along the diagonal of the matrix. This may continue for each member pair to be matched by the Grouping Algorithm accordingly. The Grouping Algorithm then makes use of matrix algebra to generate the output worksheets as described herein, in a computationally efficient manner that eliminates the need for large amounts of processing time and power that is typically associated with such well-known similar "travelling salesman"-type mathematical calculations.

The foregoing describes the brute force application of GROUPING GURU to assemble groups of smaller amounts of items or personnel. When there are larger numbers involved, meta-heuristics may be employed to save in computational time to create the desired groupings. The brute-force method for may generally be useful for smaller sets of data (preferably about 30 members in groups of no more than 8 per group). As the numbers get larger, brute force becomes more difficult due to the amount of combinations. In this case, a heuristic (Tabu Search) is utilized to solve this problem. The general steps for this algorithm are as follows:
Initialize the data sets:
Fill a matrix that contains all of the input data
Calculate the distances between all of the elements in the data array
Initialize each group with the two elements that are nearest each other (and then remove them from the list of elements so they are not reused)
Loop through each element that is still left and place it in the group so that it is the best fit and remove that element from the list, ensuring that every group is full or full less one element.
Now the data sets are initialized with elements that are close to each other, however, this does not ensure that it is the overall best solution (the initial loads could be better together or groups were filled before a better element came along, etc.) so the following grouping must be done.
Grouping Algorithm:
Loop through each group creating a distance score for each group.
For max iterations (1000) Looping through each element of each group
Find the distance if an element in each group is swapped with each element of another group, ensuring that there are no dups and proportionality is correct
Sort them to get the swap with the best distance, if this distance is better than the previous best solution set, then use this swap as the new best solution
Randomly do the swap with one of the top three swaps and repeat again
Track solutions that are not valid or no longer valid so that they are not attempted again.

In the end, the best solution set will have been found.

Referring to FIG. 18, another generated output worksheet may include a Raw_Member_Scores Worksheet 1800 that contains each of the groups in sorted order, with each row having the first N columns as the member number for each of the N members in the group. The Raw_Member_Scores Worksheet 1800 then displays the overall group score for each determined group as calculated by the Grouping Algorithm.

The process 1100 commences at step 1102 where the Grouping Algorithm reads the Configuration Worksheet 1200 in order to set the parameters to perform a grouping run and to define the layout of the Input Data_Sheet Worksheet 1300.

At step 1104, the Grouping Algorithm identifies any errors in the processing of the Configuration Worksheet 1200. If any errors result from such processing, the process 1100 continues to step 1114 where the errors are identified and fixed (such as by adding default values or transmitting a request for manual correction to an administrator) and the process 1100 restarts.

Next, at step 1106, the Grouping Algorithm reads in the member profile information for assembling the Input Data_Sheet Worksheet 1300. At step 1108, the Grouping Algorithm identifies any errors in the processing of the Input Data_Sheet Worksheet 1300. If any errors result from such processing, the process 1100 continues to step 1114 where the errors are identified and fixed (such as by adding default values or transmitting a request for manual correction to an administrator) and the process 1100 restarts.

If no errors are found, the process 1100 continues to step 1110 where the Grouping Algorithm is programmed to loop through each member profile and compare the relevant values in each column against each of the remaining member profile information to create a rank or score of how well each member matches. See the Raw Match Score Worksheet 1700 for examples.

Next, at step 1112, the Grouping Algorithm identifies any errors in the processing of the Raw Match Score Worksheet 1700. If any errors result from such processing, the process 1100 continues to step 1114 where the errors are identified and fixed (such as by running the matching again with error checking routines) and the process 1100 restarts.

If no errors are identified, the process 1100 continues to step 1116, where the Grouping Algorithm calculates a group score for every possible group based upon the number of members per group, which groups may then be sorted for example by highest to lowest calculated group score. See, FIG. 18 for an example of calculated group scores.

Next, at step 1118, the Grouping Algorithm identifies any errors in the processing of the group scores. If any errors result from such processing, the process 1100 continues to step 1114 where the errors are identified and fixed (such as by running the matching again with error checking routines) and the process 1100 restarts.

If no errors are found, the process 1100 continues to step 1120 where the Grouping Algorithm creates a set of groups from the sorted list of groups for each of the desired number of rounds, such that every member is used in every round with no groups being repeated, when desired. The outputs may be presented in the output worksheets 1400-1600 as described further herein, after which the process 1100 ends.

Weighting is very important to define attributes that are more important in creating groups. Weighting can be set at the member profile level and/or at the overall Grouping Algorithm level. Weighting at the member profile level is accomplished by adding a column to the Input Data_Sheet Worksheet 1300 that holds the weight value to be employed. Weighting at the application level is accomplished by putting in a Default Weight for that column in the Configuration Worksheet 1200. Member level weights take preference over application level weights, as desired. If there is no weighting done at the member profile level or the overall application level, then a neutral default weight, such as "1," may be used for that member profile attribute.

When the Grouping Algorithm is used for a dating site, some attributes are more important than others for finding a match between members being grouped. Some of the more important attributes may be the gender of the other person, where they are located, and their age. The administrator setting up the grouping run can set defaults for these columns in the Input Data_Sheet Worksheet 1300 as follows (for example):

Gender Interested In: Weight 1000
Location: Weight 250
Age: Weight 100
Likes Sports: Weight 1

In the above example, using those sample weights will allow the Grouping Algorithm to first group on gender as the most important profile attribute, then Location, then Age, then anything else. This weighting eliminates the need for excess processing power since less matching candidates are more quickly eliminated from consideration.

In completing the Grouping Algorithm functions, certain assumptions may be employed. Namely, it is assumed that:
  Each member can be in only one group at a time (this is useful for groups used for live events—online or in person)
  All groups need at least two members (otherwise it's not a group)
  Default weight for all attributes is "1" if nothing is otherwise set. Again, weighting is very important to differentiate which profile attributes are most important.

Overall steps for using this Grouping Algorithm may include:
  (1) Create a worksheet with the profile information for each of the members (Default Name: Data_Sheet but any name can be used);
  (2) Update the Config Worksheet to define the parameters for running this algorithm (for instance, setting the number of groups, number of rounds, allowing repeats within groups, etc.);
  (3) Update the Config Worksheet to define the layout of the Input Data_Sheet Worksheet 1300; and
  (4) Run the algorithm and review/display the output via a website.

Turning to FIG. 20, therein is provided a first partial version of an Output Data Set 2000 resulting from running the Grouping Algorithm using the described Configuration Worksheet 1200 and the Input Data_Sheet Worksheet 1300. The first Output Data Set 2000 as shown in relevant part may include, for example, a group of eight people located in New York and another group of eight people in California to help illustrate how the Grouping Algorithm separates members between the two locations using the member's preferences. Any number of people may be accommodated, as desired.

The three main factors in this displayed first Output Data Set 2000 are Gender (weight value="1000"), Location (weight value="250") and Age (weight value="100"). After each name is shows their profile information for easier matching, it has gender, age, location, as in the first row listing member name "Alice—F20LA."

Turning to FIG. 21, there is depicted one relevant portion of a second Output Data Set 2100 showing the results of a run for a "Groups_Sorted_By_Rounds" Worksheet 2700 (below) in several different ways. As shown, sixteen members, for example, may be grouped into sets of four, thereby displaying all four groups per round for two grouping rounds.

Turning now to FIG. 22, there is depicted a relevant portion of a third Output Data Set 2200 showing sixteen members grouped into sets of two, resulting in eight groups per round for two grouping rounds.

Turning now to FIG. 23, there is depicted a relevant portion of a fourth Output Data Set 2300, which is for the first twelve members of the original set of sixteen members as described immediately above. The fourth Output Data Set 2300 has a group of eight people in New York and another group of four people in California to help show how the Grouping Algorithm separates between the two locations in this scenario.

Turning now to FIG. 24, there is depicted a relevant portion of a fifth Output Data Set 2400, showing, for example, twelve or more members (i.e., the first twelve of the original sixteen members defined above) grouped into sets of four, resulting in three groups per round for two grouping rounds, in one exemplary desired grouping format.

Turning now to FIG. 25, there is depicted a relevant portion of a sixth Output Data Set 2500 showing twelve members (i.e., the first twelve of the original sixteen described above) grouped into sets of three, resulting in four groups per round for two grouping rounds.

Turning now to FIG. 26, there is depicted a relevant portion of a seventh Output Data Set 2600 showing twelve members (i.e., the first twelve of the original sixteen described above) grouped into sets of three, resulting in six groups per round for two rounds.

Turning now to FIG. 27, there is depicted an exemplary version of a "Groups_Sorted_By_Rounds" Worksheet 2700 which results after running the sixteen-members by groups of two for two rounds. This worksheet 2700 may only have one member per row in various embodiments.

Turning now to FIG. 28, there is depicted an exemplary version of a Groups_Sorted_By_Members Worksheet 2800, which may result after running the sixteen members by groups of two for two rounds. Like worksheet 2700 above, this worksheet 2800 as displayed only has one member per row, but it is instead sorted by members, not rounds/groups.

When members are assigned to video breakout groups by the Grouping Algorithm in a DEEPER DATING Online event, they may listen to each other speak and look at each other's videos, in order to get a much better sense of who attracts them and interests them, and conversely, who they want to be sure to avoid. This information is frequently forgotten by many by the end of the event. When members go to their profile page, they may feel frustrated at not remembering who interested them, who they liked and for what reasons, as well as whom they might want to avoid.

To remedy this, DEEPER DATING's "Notes" functionality addresses this concern. Prior to a live DEEPER DATING event, each member will get an email or other communication with a link to a dynamic page hosting the event. Members will be shown how to open this page so that it fits to the side of the ZOOM page as may be used by DEEPER DATING Online. Other conferencing technology may likewise be readily employed as will be appreciated by one of ordinary skill in the art.

At a certain point in the event, people will be divided into a breakout group. This dynamic page which is part of the DEEPER DATING Online website will show a list of all participants with a box assigned for each one (see, e.g., FIGS. 29 and 30). When they see a participant who merits a self-reminder, they can go to that person's box and click a checkbox which then turns green to alert them in the future to the fact that they're interested in this person. If they choose to, they can also write notes about that person in their box. In front of them, they will see all the members of their breakout group and the checkmarks they made and notes they wrote for that person.

The checkmark and all the notes taken about the person will be displayed on their profile. However, ZOOM and other video-conferencing technologies typically do not allow for later recall of such entered information. Consequently, an Application Programming Interface is established to capture, transmit to and store such notes information in a memory of a server maintained by DEEPER DATING Online. After the event, participants can go to the group page for the event that lists all participants and the check marks and notes will appear there for their review.

This creates a sense of control and organization for the participants. They feel less scattered, and more engaged because they get to take notes as they experience the online event. After the event, they will very much appreciate the link between the event and the profile page because they will now have notes to remind them of everyone that they were interested in during the event, and they will also have the possibility to make notes about what the person said so that they can refer back to the person's comments if they speak after the event is over.

Because DEEPER DATING events are fast paced, it helps that at the end of each breakout group there is a sixty second pause, wherein people get ready to move into their next group. The administrator may electronically let participants know that this is a great time to make notes or click the checkmark for any of their "favorites" in the notes sections.

Participants will also be able to use that functionality after the event is over, when they have ongoing interaction with a particular participant. In this case they will continue to be able to access the notes box and add notes for themselves based on their continuing interactions. Once again, this adds a level of integration that represents an entire new level of quality and effectiveness in prior online dating events.

In order to attend or enroll in an in-person or online event, a member may perform the following:

(1) Go to the DEEPERDATING.COM website using the link in an electronically messaged invitation. The member may simply click the link to open the DEEPER DATING Online event in ZOOM or the like;
(2) Members are placed in a breakout room and will see a box for every member of that current breakout room;
(3) If a member is interested in someone else, they can click a provided checkbox. The member can also write a quick note about this person in a provided text box;
(4) When everyone in the breakout room has finished speaking, a member will have an additional minute or two to check other participants' boxes and/or make more notes;
(5) When a member goes into a new breakout room, they follow the same instructions for that new room and new set of people; and
(6) Following the event, when the member goes back to look at people's profiles, the notes and checkmarks will be next to their name to remind them about other members of interest and they can continue to take new notes (or uncheck people) at any point in the future.

Integration between the algorithm, actual video event, and the DEEPERDATING.COM has been additionally implemented on an existing WORDPRESS site. In such case, the notes technology integrates the landscape of the site, the actual DEEPER DATING online video meeting (now being implemented through ZOOM technology) and the Grouping Algorithm.

The Grouping Algorithm is used to decide each breakout group composition. This composition appears on the video screens of each breakout group, but also appears on the WORDPRESS site. On the WORDPRESS site, members see the specific names of the people in their breakout group, and only those people.

When a breakout group dissolves, the list of names of the breakout group members on the WORDPRESS site also disappear. When they enter into a new breakout group, the names of the new breakout group members appear on the WORDPRESS site, and their videos appear in the ZOOM event. All the notes and checkmarks members write during the event and thereafter all remain on the person's profile, so they always can recall reactions to their interchanges that have been noted.

Figure 29:
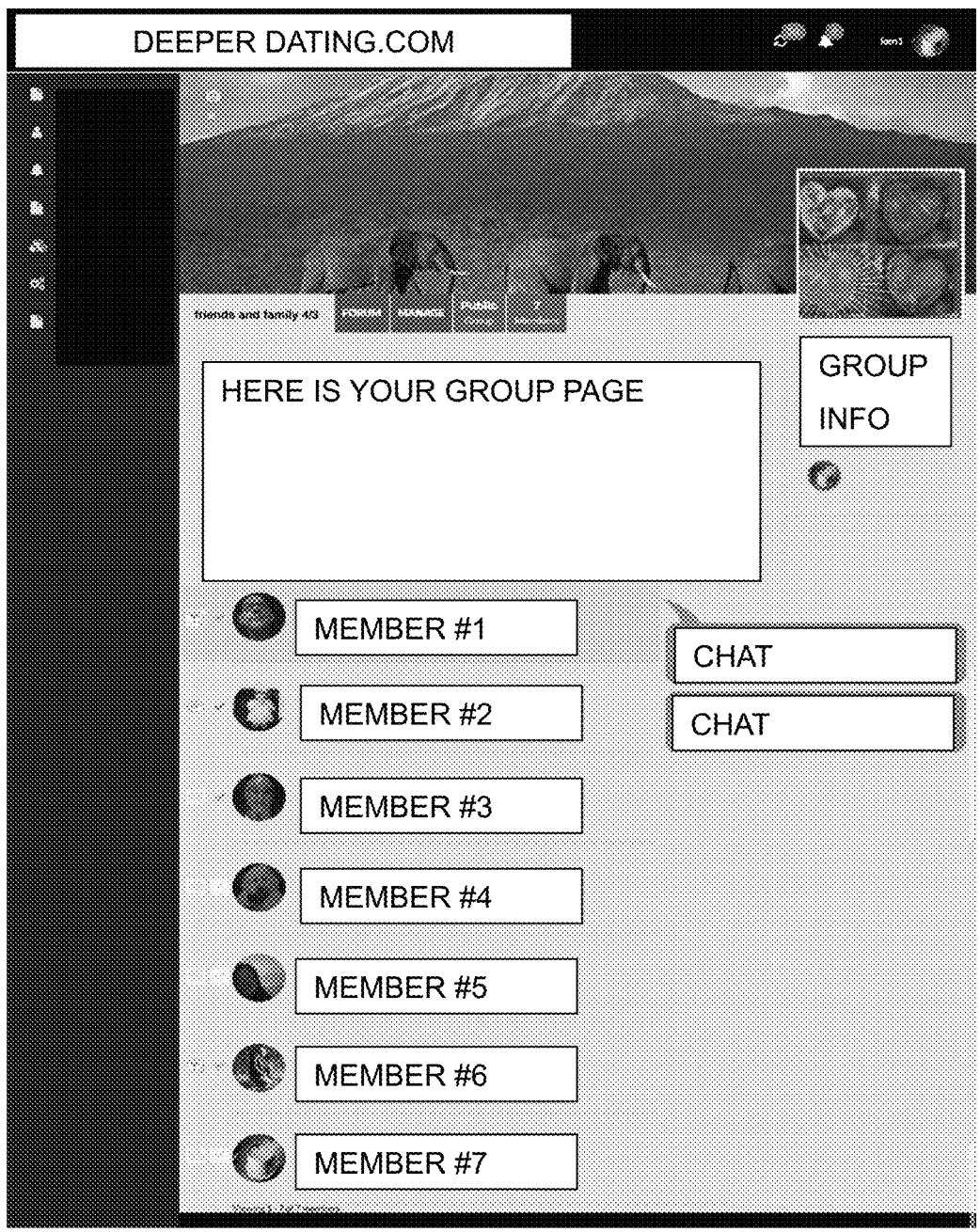
FIG. 29 is an exemplary group page presented over the network environment of FIG. 1.

FIG. 29 is a first exemplary group page 2900 presented over the network environment of FIG. 1 via the DEEPER DATING Online website. Each group member may be listed along with chat functionality and display of group information.

Figure 30:
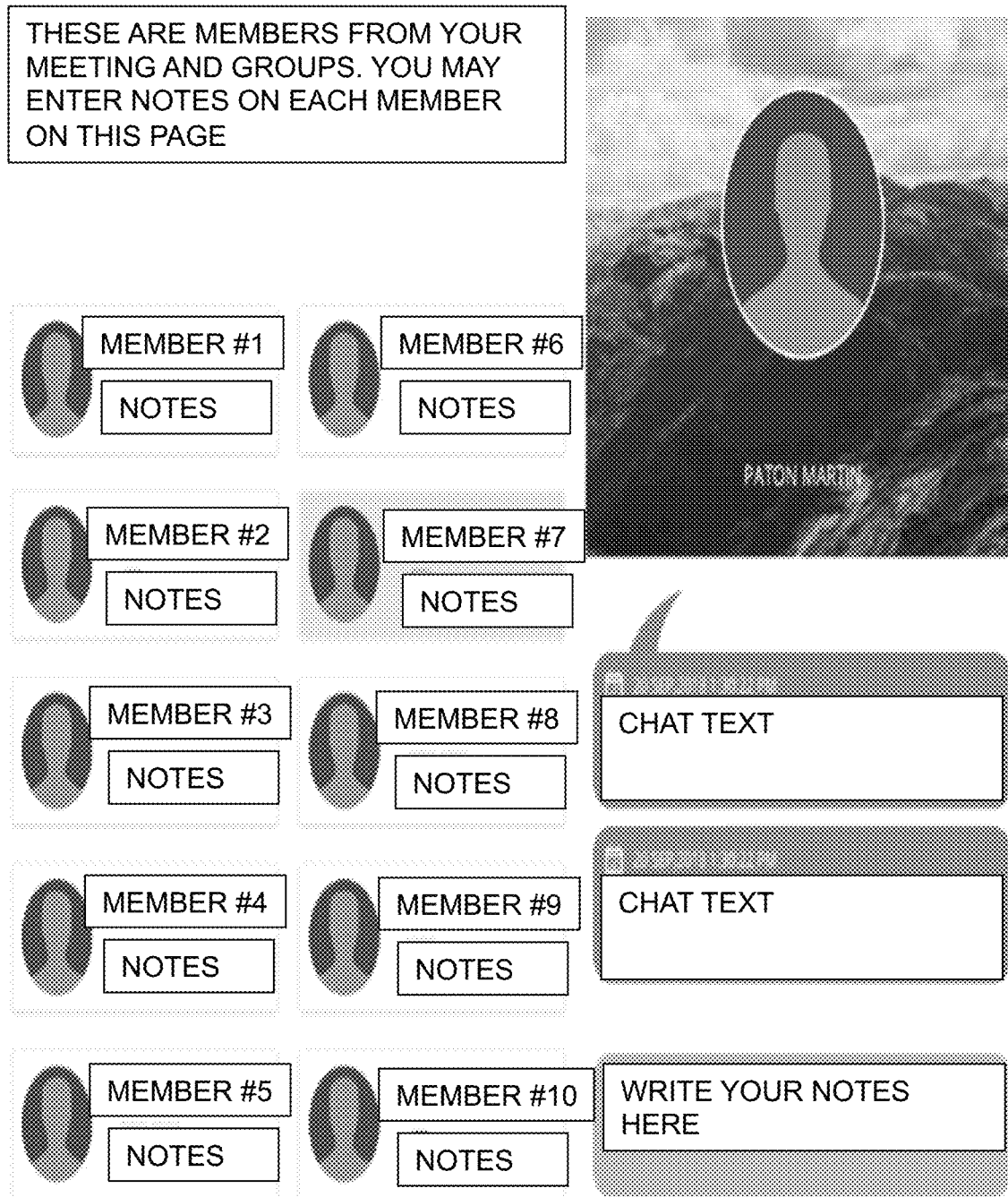
FIG. 30 is an exemplary group notes page presented over the network environment of FIG. 1.

FIG. 30 is a second exemplary group notes page 3000 presented over the network environment of FIG. 1. In addition to the functionality described immediately above, notes and checkboxes may be presented therein.

Figure 31:
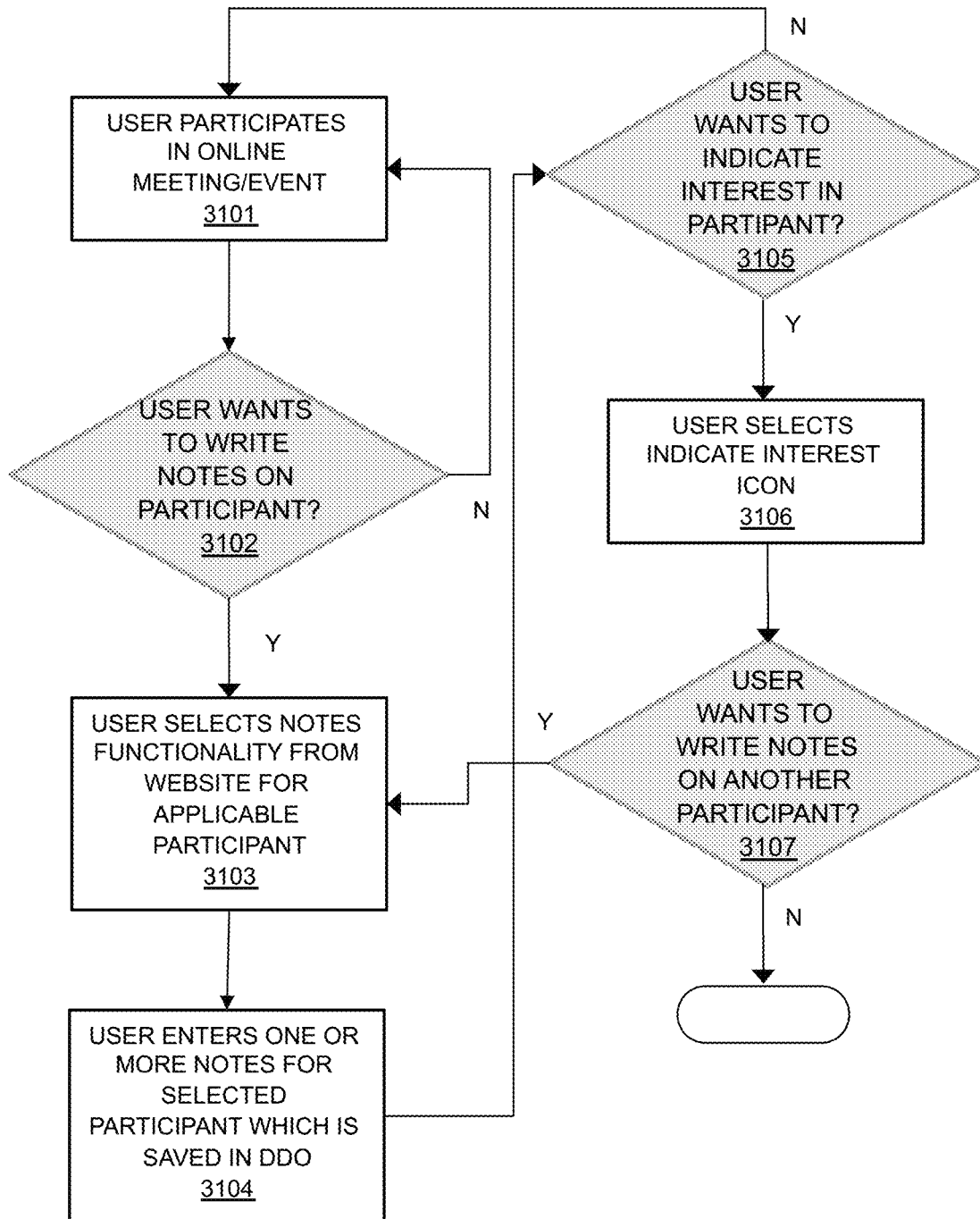
FIG. 31 is an exemplary notes process performed over the network environment of FIG. 1.

FIG. 31 is an exemplary notes process 3100 as may be performed over the network environment of FIG. 1. The process 3100 commences at step 3101, where a user or member enrolls to participate in a meeting or live event. Next, at step 3102, the member is queried or is otherwise presented with the opportunity to write one or more notes on another member in the meeting/live event. If not, the process 3100 returns to step 3101 above. Otherwise, the process 3100 continues to step 3103 where the member may select notes functionality for the desired other member or participant. At step 3104, the user enters one or more such notes, which may be stored in a database on a server hosting the data for the meeting or live event for later retrieval by the member. Next, at step 3105, the member is asked whether they want to indicate interest in communicating with another member. If not, the process 3100 returns to step 3103 above. Otherwise at step 3106, the member selects a "show interest" icon, checkbox or the like and the interest is transmitted to the other member in a designated manner (text message, email, or other transmitted indication). Finally, at step 3107, it is determined whether the member wants to write notes on any other member in the group. If so, the process 3100 returns to step 3103 above. Otherwise, the process 3100 ends.

There is also seamless integration between ZOOM video events, the activity on the DEEPER DATING Online site, and the Grouping Algorithm that creates each breakout group. Users/members may register for DEEPER DATING live event on the website and automatically receive a pre-programmed e-mail or other electronic communication containing all event related instructions, along with a link to DEEPER DATING Online site page which has link to ZOOM event and a link to the notes functionality page. This page is accessible as soon as the user logs in to DEEPER DATING website.

While a user is participating in a ZOOM event and feels the need of marking his interest in some other participant or taking notes about the other participant the user can open the Notes functionality link and search for the other member's name. As soon as the other member's name is displayed, the member can then click on a checkbox icon or the like to mark interest in the other member, or click on notes icon to write some notes about the other member. The member can write more than one note for each other member and can take notes for as many members as desired. The following is an exemplary technical workflow of this process:

Member profile information is stored in the database already while the register for the event.

Member profile information for a particular event is linked to a group which is, in turn, linked with the event such that each event has a separate group associated with it.

For notes functionality a new table in the database may be created that stores the notes in separate rows. This table may have the following columns:
1. id—stores the auto-increment id for a record
2. user_id—stores the id of the user writing notes
3. participant_id—stores the id of the user for which notes are being written
4. event id—stores the id of the event
5. group_id—stores the id of the group linked to the event
6. notes—stores the actual note data
7. datetime—stores the date and time for the notes
8. status—stores status for the notes Member interest may be stored in another table in the database. This table may have the following fields:
1. id—stores the auto-increment id for a record
2. user_id—stores the id of the user writing notes
3. participant_id—stores the id of the user for which notes are being written
4. event id—stores the id of the event
5. group_id—stores the id of the group linked to the event
6. interested—stores if the user is interested or not in another participant Using these two tables described immediately above, DEEPER DATING Online servers store the data for the Interest and Notes functionality and retrieve this information on the notes functionality page and also in the group page, which members can electronically review after the event is over. DEEPER DATING Online servers can retrieve these details anywhere on the website.

Figure 32:
FIGS. 32 and 33 are exemplary online video group pages presented over the network environment of FIG. 1.
Figure 33:
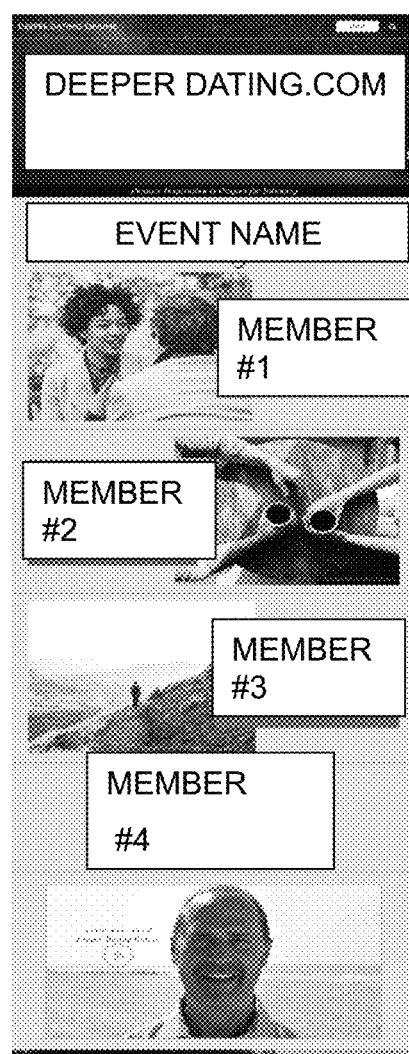

As a result of all the foregoing, FIGS. 32 and 33 provide exemplary online video groups in place of in-person event groupings, as may be presented over the network environment of FIG. 1 and resulting from the groups generated by the Grouping Algorithm. As shown in FIG. 32, a first breakout group 3200 shows four group members having a virtual teleconference in accordance with their grouping by the Grouping Algorithm. Many possible configurations for the presentation of the breakout group 3200 are readily contemplated. FIG. 33 shows another of the many possible and contemplated layouts of a video breakout group 3300 having four members, where profile data is presented and audio communications provided in place of live video.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. An improved automated method for grouping items, the method, performed exclusively by a programmable computer processing system, comprising:

receiving, via a data network, identification data for each of a plurality of items to be grouped, the identification data comprising at least first attributes and second attributes corresponding to each item;

storing the identification data for each of the plurality of items maintained in an electronic memory;

establishing a number of optimized groups to be generated from the plurality of items, where each group of the number of optimized groups is a subset of the plurality of items, and where no item from the plurality of items is placed in more than one group;

establishing a first mathematical weight value to be applied to the first attribute of each item, wherein the first mathematical weight value is selected from a programmed range of numerical values based on a determined importance of the first attribute;

establishing a second mathematical weight value to be applied to the second attribute of each item, wherein the second mathematical weight value is selected from the programmed range of numerical values based on a determined importance of the second attribute;

selecting a first item from the plurality of items;

retrieving, from the identification data in the electronic memory, a first value for a first attribute of the first item and a second value for a second attribute of the first item;

comparing the first value and the second value, to corresponding first and second values for each pair of each remaining item from the plurality of items;

generating first pair comparison scores based on said comparing, each first pair comparison score determined by adding the first value for the first item and the first value for another item, and then assigning a first score to the first values for each pair based on the adding and the corresponding first mathematical weight value;

generating second pair comparison scores based on said comparing, each second pair comparison score determined by adding the second value for the first item and the second value for another item, and then assigning a second score to the second values for each pair based on the subtracting and the corresponding second mathematical weight value;

calculating raw match scores for the first item and each of the remaining items based on an addition of the first pair comparison scores and the second pair comparison scores;

recursively performing said retrieving, comparing, generating and calculating steps for each remaining item from the plurality of items in place of the first item;

storing the raw match scores in a matrix having each slot on a main diagonal, each corresponding row and each corresponding column dedicated to one separate item of the plurality of items;

grouping the raw match scores from the matrix according to their numerical order;

generating the number of optimized groups based on a desired group size;

transmitting electronic instructions that cause the plurality of items to be sorted into the number of optimized groups; and executing a plurality of rounds of said establishing the number of optimized groups of the plurality of items using other attributes until each of the plurality of items has been grouped at least once with each remaining plurality of items, wherein an optimized group generated in any of the plurality of rounds is not repeated in any other round.

2. The method of claim 1, wherein said recursively performing includes, for a number of items greater than a threshold value, performing heuristic computations using the first and second attributes, resulting in the number of optimized groups.

3. The method of claim 1, wherein after said recursively performing, a number of items have a tied raw match score, selecting a refinement criterion for grouping an item from among the number of items having the tied raw match score, the refinement criterion including at least one attribute that was not previously used in the computing.

4. The method of claim 1, wherein each of the plurality of items comprises a manufactured product.

5. The method of claim 1, wherein each of the plurality of items comprises personnel.

6. The method of claim 1, wherein at least one of the first mathematical weight value and the second mathematical value are selectively programmed.

7. The method of claim 1, wherein at least one of the first mathematical weight value and the second mathematical value are selectively programmed by an owner of the item.

8. The method of claim 1, wherein at least one of the first mathematical weight value and the second mathematical value is variable between the range of numerical values dependent on the comparison.

9. The method of claim 1, wherein the programmable computer processing system is configured for at least one of transportation, shipping and inventory control.

10. The method of claim 1, wherein the programmable computer processing system is configured to operate a dating website.

11. The method of claim 1, wherein the plurality of items are arranged to assigned physical locations based on the optimized groups.

12. The method of claim 1, wherein the plurality of items are arranged on an electronic display based on the optimized groups.

13. The method of claim 1, further comprising providing an interface configured to allow entry of a plurality of notes into the electronic memory for each of the plurality of items.

14. An improved automated method for grouping items, the method, performed exclusively by a programmable computer processing system, comprising:

receiving, via a data network, identification data for each of a plurality of items to be grouped, the identification data comprising at least first attributes and second attributes corresponding to each item;

storing the identification data for each of the plurality of items maintained in an electronic memory;

establishing a number of optimized groups to be generated from the plurality of items, where each group of the number of optimized groups is a subset of the plurality of items, and where no item from the plurality of items is placed in more than one group;

establishing a first mathematical weight value to be applied to the first attribute of each item, wherein the first mathematical weight value is selected from a programmed range of numerical values based on a determined importance of the first attribute;

establishing a second mathematical weight value to be applied to the second attribute of each item, wherein the second mathematical weight value is selected from the programmed range of numerical values based on a determined importance of the second attribute;

selecting a first item from the plurality of items;

retrieving, from the identification data in the electronic memory, a first value for a first attribute of the first item and a second value for a second attribute of the first item;

comparing the first value and the second value, to corresponding first and second values for each pair of each remaining item from the plurality of items;

generating first pair comparison scores based on said comparing, each first pair comparison score determined by multiplying the first value for the first item and the first value for another item, and then assigning a first score to the first values for each pair based on the multiplying and the corresponding first mathematical weight value;

generating second pair comparison scores based on said comparing, each second pair comparison score determined by multiplying the second value for the first item and the second value for another item, and then assigning a second score to the second values for each pair based on the multiplying and the corresponding second mathematical weight value;

calculating raw match scores for the first item and each of the remaining items based on an addition of the first pair comparison scores and the second pair comparison scores;

recursively performing said retrieving, comparing, generating and calculating steps for each remaining item from the plurality of items in place of the first item;

storing the raw match scores in a matrix having each slot on a main diagonal, each corresponding row and each corresponding column dedicated to one separate item of the plurality of items;

grouping the raw match scores from the matrix according to their numerical order;

generating the number of optimized groups based on a desired group size;

transmitting electronic instructions that cause the plurality of items to be sorted into the number of optimized groups; and executing a plurality of rounds of said establishing the number of optimized groups of the plurality of items using other attributes until each of the plurality of items has been grouped at least once with each remaining plurality of items, wherein an optimized group generated in any of the plurality of rounds is not repeated in any other round.

15. The method of claim 14, wherein the apparatus is configured to operate a dating website.

16. The method of claim 14, wherein the programmable computer processing system is configured for at least one of transportation, shipping and inventory control.

17. An improved automated method for grouping items, the method, performed exclusively by a programmable computer processing system, comprising:

receiving, via a data network, identification data for each of a plurality of items to be grouped, the identification data comprising at least first attributes and second attributes corresponding to each item;

storing the identification data for each of the plurality of items maintained in an electronic memory;

establishing a number of optimized groups to be generated from the plurality of items, where each group of the number of optimized groups is a subset of the plurality of items, and where no item from the plurality of items is placed in more than one group;

establishing a first mathematical weight value to be applied to the first attribute of each item, wherein the first mathematical weight value is selected from a programmed range of numerical values based on a determined importance of the first attribute;

establishing a second mathematical weight value to be applied to the second attribute of each item, wherein the second mathematical weight value is selected from the programmed range of numerical values based on a determined importance of the second attribute;

selecting a first item from the plurality of items;

retrieving, from the identification data in the electronic memory, a first value for a first attribute of the first item and a second value for a second attribute of the first item;

comparing the first value and the second value, to corresponding first and second values for each pair of each remaining item from the plurality of items;

generating first pair comparison scores based on said comparing, each first pair comparison score determined by dividing the first value for the first item and the first value for another item, and then assigning a first score to the first values for each pair based on the dividing and the corresponding first mathematical weight value;

generating second pair comparison scores based on said comparing, each second pair comparison score determined by dividing the second value for the first item and the second value for another item, and then assigning a second score to the second values for each pair based on the dividing and the corresponding second mathematical weight value;

calculating raw match scores for the first item and each of the remaining items based on an addition of the first pair comparison scores and the second pair comparison scores;

recursively performing said retrieving, comparing, generating and calculating steps for each remaining item from the plurality of items in place of the first item;

storing the raw match scores in a matrix having each slot on a main diagonal, each corresponding row and each corresponding column dedicated to one separate item of the plurality of items;

grouping the raw match scores from the matrix according to their numerical order;

generating the number of optimized groups based on a desired group size;

transmitting electronic instructions that cause the plurality of items to be sorted into the number of optimized groups; and executing a plurality of rounds of said establishing the number of optimized groups of the plurality of items using other attributes until each of the plurality of items has been grouped at least once with each remaining plurality of items, wherein an optimized group generated in any of the plurality of rounds is not repeated in any other round.

18. The method of claim 17, wherein at least one of the first mathematical weight value and the second mathematical value is variable between the range of numerical values dependent on the comparison.

19. The method of claim 17, wherein the programmable computer processing system is configured for at least one of transportation, shipping and inventory control.

20. The method of claim 17, wherein the programmable computer processing system is configured to operate a dating website.

* * * * *